United States Patent
Lu et al.

(10) Patent No.: US 8,204,314 B2
(45) Date of Patent: Jun. 19, 2012

(54) METHOD AND SYSTEM FOR FINGERPRINTING DIGITAL VIDEO OBJECT BASED ON MULTIRESOLUTION, MULTIRATE SPATIAL AND TEMPORAL SIGNATURES

(75) Inventors: Jian Lu, Cupertino, CA (US); Yangbin Wang, Milpitas, CA (US)

(73) Assignee: Vobile, Inc., Santa Clara, CA (US)

( * ) Notice: Subject to any disclaimer, the term of this patent is extended or adjusted under 35 U.S.C. 154(b) by 1191 days.

(21) Appl. No.: 11/949,511

(22) Filed: Dec. 3, 2007

(65) Prior Publication Data

US 2009/0141805 A1 Jun. 4, 2009

(51) Int. Cl.
*G06K 9/68* (2006.01)
(52) U.S. Cl. .......................................... 382/218; 382/124
(58) Field of Classification Search .................. 382/218, 382/124
See application file for complete search history.

(56) References Cited

U.S. PATENT DOCUMENTS

| | | | | |
|---|---|---|---|---|
| 5,486,863 | A * | 1/1996 | Auyeung et al. | 375/240.24 |
| 7,818,577 | B2 * | 10/2010 | David et al. | 713/176 |
| 7,881,505 | B2 * | 2/2011 | Schneiderman et al. | 382/118 |
| 2006/0280246 | A1 | 12/2006 | Alattar et al. | |
| 2007/0253594 | A1 | 11/2007 | Lu et al. | |
| 2009/0141805 | A1 * | 6/2009 | Lu et al. | 375/240.24 |
| 2011/0081043 | A1 * | 4/2011 | Sabol et al. | 382/103 |

* cited by examiner

*Primary Examiner* — Gregory M Desire
(74) *Attorney, Agent, or Firm* — Ogawa P.C.

(57) ABSTRACT

A method and system for generating a spatial signature for a frame of a video object. The method includes obtaining a frame associated with a video object, and dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the method includes determining a plurality of average pixel values for the plurality of blocks respectively. Each of the plurality of blocks corresponds to one of the plurality of average pixel values. Moreover, the method includes processing information associated with the plurality of average pixel values and determining a plurality of comparison values for the plurality of blocks respectively based on at least information associated with the plurality of average pixel values.

30 Claims, 12 Drawing Sheets

Process of fingerprinting a Video Object

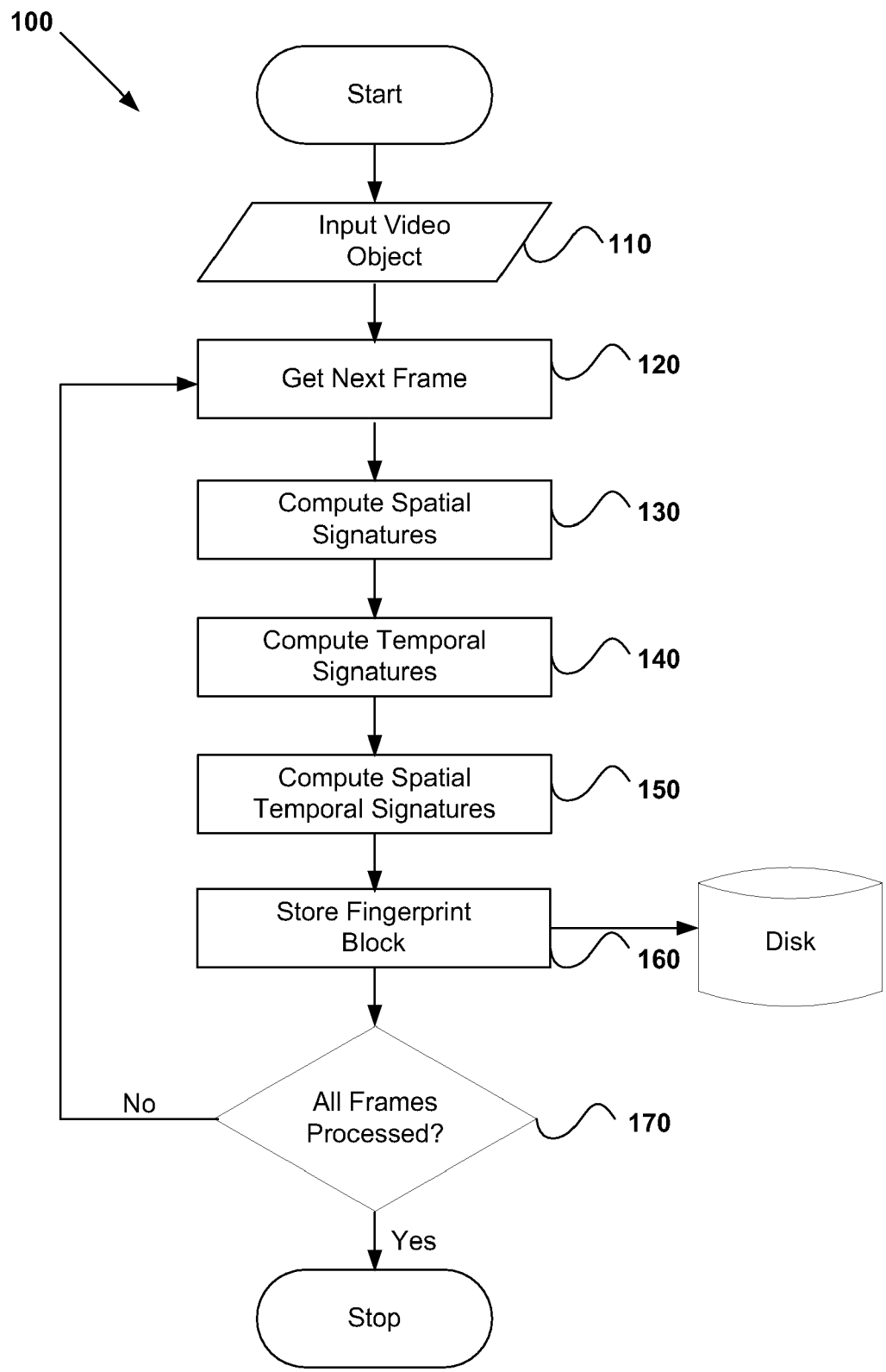
Figure 1: Process of fingerprinting a Video Object

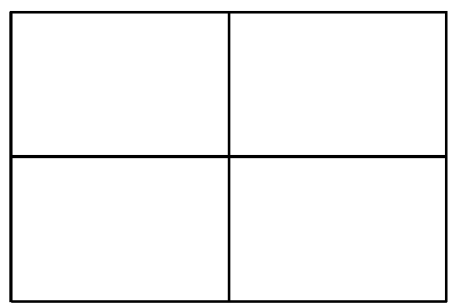 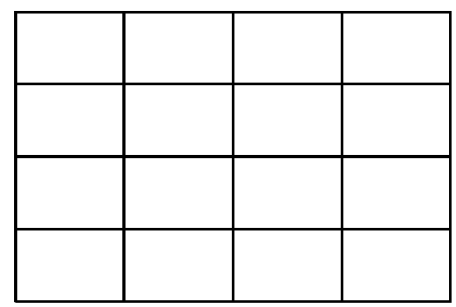
(a) (b)
Figure 2: Computing Spatial Signatures at multiple resolutions.
       (a) a frame is divided into 2x2 blocks;
       (b) a frame is divided into 4x4 blocks.

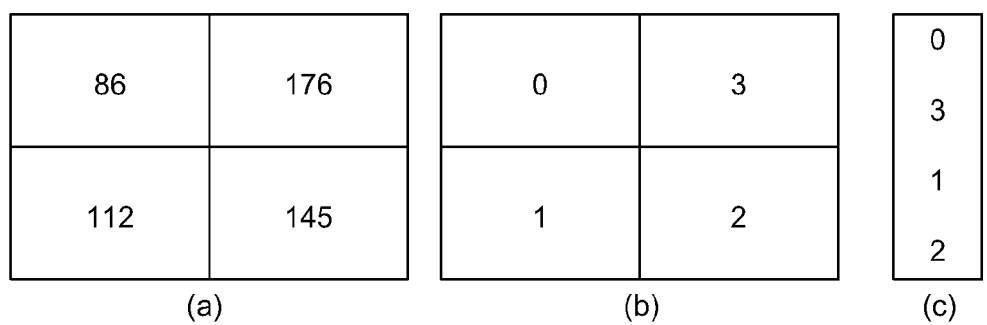
Figure 3: Computing the Base Spatial Signature (BSS) over 2x2 blocks. (a) the mean pixel value of each block; (b) the ordinal rank of each block; (c) the BSS vector.

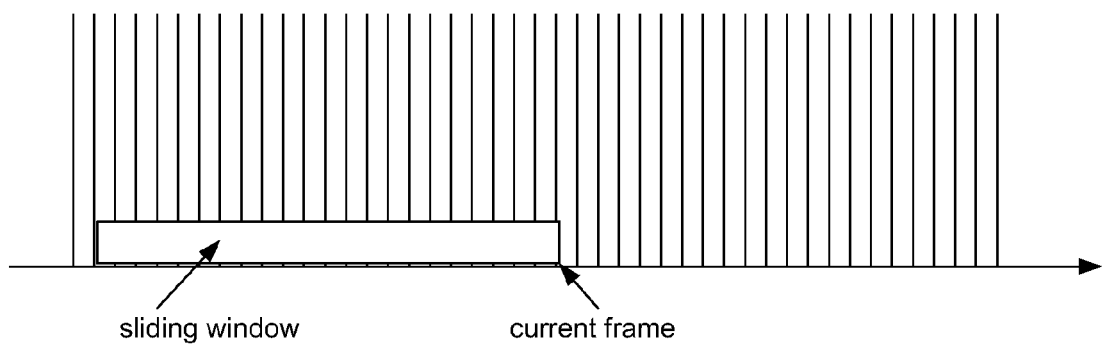
Figure 4: Positioning a sliding window in computing Temporal Signatures.

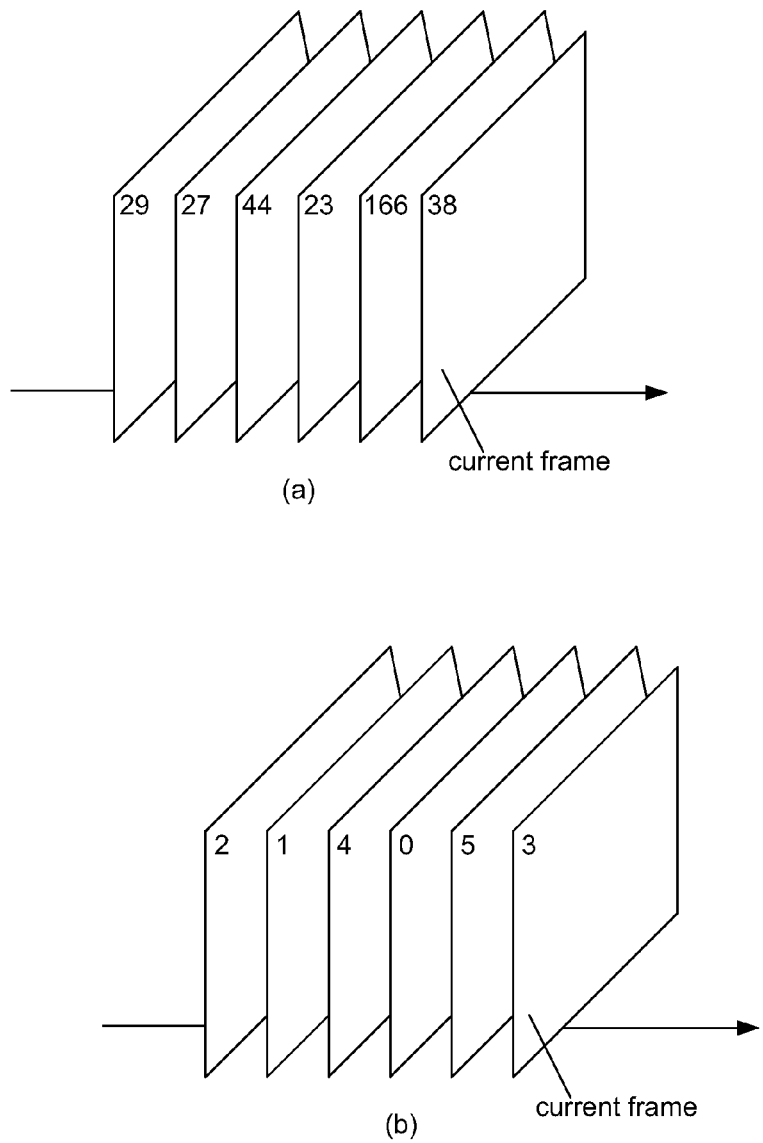
Figure 5: Computing the Temporal Signature over a downsampled group of frames. (a) the sum of absolute pixel difference between two consecutive frames; (b) the ordinal rank of each frame; the TS of the current frame is its ordinal work.

| 86 | 176 |
|---|---|
| 112 | 145 |

(a)

| $(q_{1,1}\ r_{1,1})$ | $(q_{1,2}\ r_{1,2})$ |
|---|---|
| $(q_{2,1}\ r_{2,1})$ | $(q_{2,2}\ r_{2,2})$ |

(b)

$(q_{1,1}\ r_{1,1})$
$(q_{1,2}\ r_{1,2})$
$(q_{2,2}\ r_{2,2})$
$(q_{2,1}\ r_{2,1})$ } Spatial Signature (c)

Figure 7

| $(q_{1,1}\ r_{1,1})$ | $(q_{1,2}\ r_{1,2})$ | $(q_{1,3}\ r_{1,3})$ | $(q_{1,4}\ r_{1,4})$ |
|---|---|---|---|
| $(q_{2,1}\ r_{2,1})$ | $(q_{2,2},\ r_{2,2})$ | $(q_{2,3}\ r_{2,3})$ | $(q_{2,4}\ r_{2,4})$ |
| $(q_{3,1}\ r_{3,1})$ | $(q_{3,2}\ r_{3,2})$ | $(q_{3,3}\ r_{3,3})$ | $(q_{3,4}\ r_{3,4})$ |
| $(q_{4,1}\ r_{4,1})$ | $(q_{4,2}\ r_{4,2})$ | $(q_{4,3}\ r_{4,3})$ | $(q_{4,4}\ r_{4,4})$ |

Figure 8

| $S_{1,1}$ | $S_{1,2}$ | $S_{1,3}$ | $S_{1,4}$ |
|---|---|---|---|
| $S_{2,1}$ | $S_{2,2}$ | $S_{2,3}$ | $S_{2,4}$ |
| $S_{3,1}$ | $S_{3,2}$ | $S_{3,3}$ | $S_{3,4}$ |
| $S_{4,1}$ | $S_{4,2}$ | $S_{4,3}$ | $S_{4,4}$ |

METHOD AND SYSTEM FOR FINGERPRINTING DIGITAL VIDEO OBJECT BASED ON MULTIRESOLUTION, MULTIRATE SPATIAL AND TEMPORAL SIGNATURES

CROSS-REFERENCES TO RELATED APPLICATIONS

This application is related to U.S. patent application Ser. No. 11/681,567, filed Mar. 2, 2007, which claims priority to U.S. Provisional Application No. 60/795,786, filed Apr. 28, 2006. Both applications are commonly assigned and incorporated by reference herein for all purposes.

BACKGROUND OF THE INVENTION

This invention relates to techniques for characterizing and fingerprinting digital video object. In particular, this invention relates to method and system for generating a unique and robust identifier for a digital video object based on multiresolution, multirate spatial and temporal signatures.

Digital video has become very popular in the last decade. There are many sources from which digital video is created, recorded and distributed, such as DV camcorders, DVD, DVR, and video download and streaming over the Internet. A piece of digital video is called a digital video object or simply video object in this document. It may be a file that is saved on a storage media such as a hard disk drive, or a bitstream that is transmitted over a broadcast channel or over the Internet. The constantly increasing number of digital video objects and proliferation of digital video entertainment and services demand effective and efficient methods and systems for indexing and identifying digital video objects.

A common method for uniquely identifying a digital object is to pass it through a hash function that produces a fixed-length output known as hash sum or message digest. A popular hash function is MD5 that is specified by RFC 1321. While a hash sum as an identifier is useful for certain purposes such as data integrity check, it is often inadequate for content identifications. For example, a digital video object may be encoded in various formats such as MPEG4 and Windows Media, and at various bitrates such as 2 Mbps for broadcast and 700 Kbps for Internet download. The hash sum value will be different for each of these formats though the content is the same. A fingerprint of a digital video object is different from a hash sum in that the former is a unique identifier for the video content while the latter is a unique identifier for the file. Having a unique and robust fingerprint for each and every video object enables many applications, such as video content indexing, search and retrieval, content filtering, broadcast monitoring, and metadata services.

BRIEF SUMMARY OF THE INVENTION

The present invention relates in general to video signal processing. More particularly, the invention provides a method and system for characterizing a digital video object. Merely by way of example, the invention is described as it applies to obtaining spatial signatures for multiple resolutions, temporal signatures for multiple frame rates, and/or spatial-temporal signatures, but it should be recognized that the invention has a broader range of applicability.

According to an embodiment of the present invention, a method for generating a fingerprint for a video object includes obtaining a plurality of frames associated with a video object. Additionally, the method includes, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponding to a plurality of frame rates respectively. Moreover, the method includes, for each of the plurality of frames, processing information associated with the plurality of spatial signatures and the plurality of temporal signatures, and determining a frame fingerprint for the each of the plurality of frames, the frame fingerprint including the plurality of spatial signatures corresponding to the plurality of resolutions respectively and the plurality of temporal signatures corresponding to the plurality of frame rates respectively. Also, the method includes processing a plurality of frame fingerprints for the plurality of frames respectively, the plurality of frame fingerprints including the frame fingerprint for the each of the plurality of frames. Additionally, the method includes determining a video fingerprint for the video object, the video fingerprint including the plurality of frame fingerprints.

According to another embodiment of the present invention, a method for generating a spatial signature for a frame of a video object includes obtaining a frame associated with a video object, and dividing the frame into a plurality of blocks, the plurality of blocks corresponding to a plurality of locations respectively. Each of the plurality of blocks includes a plurality of pixels, and the plurality of pixels corresponds to a plurality of pixel values respectively. Additionally, the method includes determining a plurality of average pixel values for the plurality of blocks respectively, processing the plurality of average pixel values, and determining a plurality of ranks for the plurality of blocks respectively based on at least information associated with the plurality of average pixel values. Each of the plurality of ranks corresponds to a block. Moreover, the method includes processing information associated with the plurality of ranks, and determining a sequence of ranks based on at least information associated with the plurality of ranks and the plurality of locations. A spatial signature for the frame includes information associated with the sequence of ranks.

According to yet another embodiment of the present invention, a method for generating a temporal signature for a frame of a video object includes obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the method includes processing information associated with the first plurality of frames, and determining a plurality of difference values for the first plurality of frames respectively. Each of the plurality of difference values corresponds to the each of the first plurality of frames and the adjacent frame. Moreover, the method includes processing information associated with the plurality of difference values, and determining a plurality of ranks corresponding to the first plurality of frames respectively based on at least information associated with the plurality of difference values. The plurality of ranks includes a rank corresponding to the frame, and the rank is a temporal signature for the frame.

According to yet another embodiment of the present invention, a method for generating a spatial-temporal signature for a frame of a video object includes obtaining a first plurality of frames associated with a video object. The first plurality of frames includes at least a frame, and each of the first plurality of frames corresponds to an adjacent frame. Additionally, the method includes dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the method includes processing information associated with the first plurality of frames. Also, the method includes, for each of the first plurality of blocks, determining a plurality of difference values for the second plurality of blocks respectively. Each of the plurality of difference values is associated with the each of the second plurality of blocks and a corresponding block on the adjacent frame. Additionally, the method includes, for each of the first plurality of blocks, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Moreover, the method includes processing information associated with a second plurality of ranks corresponding to the first plurality of blocks respectively, and determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks.

According to yet another embodiment of the present invention, a computer program product includes a computer readable medium including instructions for generating a fingerprint for a video object. The computer readable medium includes one or more instructions for obtaining a plurality of frames associated with a video object. Additionally, the computer readable medium includes one or more instructions for, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponds to a plurality of frame rates respectively. Moreover, the one or more instructions are for, for each of the plurality of frames, processing information associated with the plurality of spatial signatures and the plurality of temporal signatures, and determining a frame fingerprint for the each of the plurality of frames. The frame fingerprint includes the plurality of spatial signatures corresponding to the plurality of resolutions respectively and the plurality of temporal signatures corresponding to the plurality of frame rates respectively. Also, the computer readable medium includes one or more instructions for processing a plurality of frame fingerprints for the plurality of frames respectively, and one or more instructions for determining a video fingerprint for the video object. The plurality of frame fingerprints includes the frame fingerprint for the each of the plurality of frames, and the video fingerprint includes the plurality of frame fingerprints.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively, one or more instructions for processing the plurality of average pixel values, and one or more instructions for determining a plurality of ranks for the plurality of blocks respectively based on at least information associated with the plurality of average pixel values, each of the plurality of ranks corresponding to a block. Moreover, the computer readable medium includes one or more instructions for processing information associated with the plurality of ranks, and one or more instructions for determining a sequence of ranks based on at least information associated with the plurality of ranks and the plurality of locations. A spatial signature for the frame includes information associated with the sequence of ranks.

According to yet another embodiment of the present invention, a computer program product includes a computer readable medium including instructions for generating a temporal signature for a frame of a video object. The computer readable medium includes one or more instructions for obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the computer readable medium includes one or more instructions for processing information associated with the first plurality of frames, and one or more instructions for determining a plurality of difference values for the first plurality of frames respectively. Each of the plurality of difference values corresponding to the each of the first plurality of frames and the adjacent frame. Moreover, the computer readable medium includes one or more instructions for processing information associated with the plurality of difference values, and one or more instructions for determining a plurality of ranks corresponding to the first plurality of frames respectively based on at least information associated with the plurality of difference values. The plurality of ranks includes a rank corresponding to the frame, and the rank is a temporal signature for the frame.

According to yet another embodiment of the present invention, a computer program product includes a computer readable medium including instructions for generating a spatial-temporal signature for a frame of a video object. The computer readable medium includes one or more instructions for obtaining a first plurality of frames associated with a video object. The first plurality of frames includes at least a frame, and each of the first plurality of frames corresponds to an adjacent frame. Additionally, the computer readable medium includes one or more instructions for dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the computer readable medium includes one or more instructions for processing information associated with the first plurality of frames. Also, the computer readable medium includes one or more instructions for, for each of the first plurality of blocks, determining a plurality of difference values for the second plurality of blocks respectively, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Each of the plurality of difference values is associated with the each of the second plurality of blocks and a corresponding block on the adjacent frame. Additionally, the computer readable medium includes one or more instructions for processing information associated with a second plurality of ranks corresponding to the first plurality of blocks respectively, and one or more instructions for determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks.

Many benefits are achieved by way of the present invention over conventional techniques. Certain embodiments of the present invention can generate a robust fingerprint which either does not change or change only slightly with different formats, bitrates, or resolutions, and/or with certain alterations and/or distortions for the same video object. Some embodiments of the present invention can generate a fingerprint that is highly discriminating so that two video objects containing different video contents would yield significantly different fingerprints. Certain embodiments of the present invention can generate a fingerprint that is compact for storage, and can be stored in a form for efficient search and matching.

According to yet another embodiment of the present invention, a method for generating a spatial signature for a frame of a video object includes obtaining a frame associated with a video object, and dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the method includes determining a plurality of average pixel values for the plurality of blocks respectively. Each of the plurality of blocks corresponds to one of the plurality of average pixel values. Moreover, the method includes processing information associated with the plurality of average pixel values and determining a plurality of comparison values for the plurality of blocks respectively based on at least information associated with the plurality of average pixel values. Each of the plurality of blocks corresponds to at least a first comparison value of the plurality of comparison values, and each of the plurality of comparison values corresponds to one of the plurality of blocks and is equal to one selected from a group consisting of a first constant and a second constant. Also, the method includes processing information associated with the plurality of comparison values, and determining a sequence of comparison values based on at least information associated with the plurality of indices and the plurality of locations. The spatial signature for the frame includes information associated with the sequence of comparison values. The process for determining a plurality of comparison values includes, for each of the plurality of blocks, determining whether a first adjacent block exists for the each of the plurality of blocks based on at least information associated with one or more first predetermined criteria, and if the first adjacent block is determined to exist, determining the first comparison value based on at least information associated with a first average pixel value corresponding to the each of the plurality of blocks and a second average pixel value corresponding to the first adjacent block.

According to yet another embodiment of the present invention, a method for generating a temporal signature for a frame of a video object includes obtaining a plurality of frames at a first frame rate and associated with a video object. The plurality of frames includes at least a first frame, and the first frame includes a first plurality of pixels. Additionally, the method includes processing information associated with the plurality of frames, and determining a second frame based on at least information associated with the plurality of frames. The second frame includes a second plurality of pixels and is adjacent to the first frame based on at least information associated with a second frame rate. Moreover, the method includes processing information associated with a first plurality of pixel values corresponding to the first plurality of pixels respectively and a second plurality of pixel values corresponding to the second plurality of pixels respectively. Also, the method includes determining a sum of absolute differences between the first plurality of pixel values and the second plurality of pixel values respectively, processing information associated with the sum of absolute differences, determining a normalized difference by dividing the sum of absolute differences by the number of pixels for the first plurality of pixels, and performing a quantization process on the normalized difference to generate a integer difference. The integer difference is associated with a temporal signature for the first frame.

According to yet another embodiment of the present invention, a method for generating a spatial-temporal signature for a frame of a video object includes obtaining a plurality of frames at a first frame rate and associated with a video object. The plurality of frames includes at least a first frame. Additionally, the method includes dividing the first frame into a first plurality of blocks. The first plurality of blocks corresponds to a first plurality of locations respectively, each of the first plurality of blocks includes a first plurality of pixels, and the first plurality of pixels corresponds to a first plurality of pixel values respectively. Moreover, the method includes determining a first plurality of average pixel values for the first plurality of blocks respectively. Each of the first plurality of blocks corresponds to one of the first plurality of average pixel values. Also, the method includes processing information associated with the plurality of frames, and determining a second frame based on at least information associated with the plurality of frames. The second frame is adjacent to the first frame based on at least information associated with a second frame rate. The second frame includes a second plurality of blocks corresponding to a second plurality of locations respectively and corresponding to a second plurality of average pixel values respectively. Additionally, the method includes processing information associated with the first plurality of average pixel values, the first plurality of locations, the second plurality of average pixel values, and the second plurality of locations. Each of the first plurality of average pixel values corresponds to one of the second plurality of average pixel values. Moreover, the method includes determining a plurality of comparison values for the first plurality of blocks respectively based on at least information associated with the first plurality of average pixel values and the second plurality of average pixel values. Each of the plurality of comparison values is equal to one selected from a group consisting of a first constant and a second constant. Also, the method includes processing information associated with the plurality of comparison values, and determining a sequence of comparison values based on at least information associated with the plurality of indices and the first plurality of locations. The spatial-temporal signature for the first frame corresponds to the second frame rate and including information associated with the sequence of comparison values.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively. Each of the plurality of blocks corresponds to one of the plurality of average pixel values. Moreover, the computer readable medium includes one or more instructions for processing information associated with the plurality of average pixel values, and one or more instructions for determining a plurality of comparison values for the plurality of blocks respectively based on at least information associated with the plurality of average pixel values. Each of the plurality of blocks corresponds to at least a first comparison value of the plurality of comparison values, and each of the plurality of comparison values corresponds to one of the plurality of blocks and is equal to one selected from a group consisting of a first constant and a second constant. Also, the computer readable medium includes one or more instructions for processing information associated with the plurality of comparison values, and one or more instructions for determining a sequence of comparison values based on at least information associated with the plurality of indices and the plurality of locations. The spatial signature for the frame includes information associated with the sequence of comparison values. The one or more instructions for determining a plurality of comparison values includes, one or more instructions, for each of the plurality of blocks, for determining whether a first adjacent block exists for the each of the plurality of blocks based on at least information associated with one or more first predetermined criteria, and if the first adjacent block is determined to exist, determining the first comparison value based on at least information associated with a first average pixel value corresponding to the each of the plurality of blocks and a second average pixel value corresponding to the first adjacent block.

According to yet another embodiment of the present invention, a computer program product includes a computer readable medium including instructions for generating a temporal signature for a frame of a video object. The computer readable medium includes one or more instructions for obtaining a plurality of frames at a first frame rate and associated with a video object. The plurality of frames includes at least a first frame, and the first frame includes a first plurality of pixels. Additionally, the computer readable medium includes one or more instructions for processing information associated with the plurality of frames, and one or more instructions for determining a second frame based on at least information associated with the plurality of frames. The second frame includes a second plurality of pixels and is adjacent to the first frame based on at least information associated with a second frame rate. Moreover, the computer readable medium includes one or more instructions for processing information associated with a first plurality of pixel values corresponding to the first plurality of pixels respectively and a second plurality of pixel values corresponding to the second plurality of pixels respectively. Also, the computer readable medium includes one or more instructions for determining a sum of absolute differences between the first plurality of pixel values and the second plurality of pixel values respectively, one or more instructions for processing information associated with the sum of absolute differences, one or more instructions for determining a normalized difference by dividing the sum of absolute differences by the number of pixels for the first plurality of pixels, and one or more instructions for performing a quantization process on the normalized difference to generate a integer difference. The integer difference is associated with a temporal signature for the first frame.

According to yet another embodiment of the present invention, a computer program product includes a computer readable medium including instructions for generating a spatial-temporal signature for a frame of a video object. The computer readable medium includes one or more instructions for obtaining a plurality of frames at a first frame rate and associated with a video object. The plurality of frames includes at least a first frame. Additionally, the computer readable medium includes one or more instructions for dividing the first frame into a first plurality of blocks. The first plurality of blocks corresponds to a first plurality of locations respectively, each of the first plurality of blocks includes a first plurality of pixels, and the first plurality of pixels corresponds to a first plurality of pixel values respectively. Moreover, the computer readable medium includes one or more instructions for determining a first plurality of average pixel values for the first plurality of blocks respectively. Each of the first plurality of blocks corresponds to one of the first plurality of average pixel values. Also, the computer readable medium includes one or more instructions for processing information associated with the plurality of frames, and one or more instructions for determining a second frame based on at least information associated with the plurality of frames. The second frame is adjacent to the first frame based on at least information associated with a second frame rate, and the second frame includes a second plurality of blocks corresponding to a second plurality of locations respectively and corresponding to a second plurality of average pixel values respectively. Additionally, the computer readable medium includes one or more instructions for processing information associated with the first plurality of average pixel values, the first plurality of locations, the second plurality of average pixel values, and the second plurality of locations. Each of the first plurality of average pixel values corresponds to one of the second plurality of average pixel values. Moreover, the computer readable medium includes one or more instructions for determining a plurality of comparison values for the first plurality of blocks respectively based on at least information associated with the first plurality of average pixel values and the second plurality of average pixel values. Each of the plurality of comparison values is equal to one selected from a group consisting of a first constant and a second constant. Also, the computer readable medium includes one or more instructions for processing information associated with the plurality of comparison values, and one or more instructions for determining a sequence of comparison values based on at least information associated with the plurality of indices and the first plurality of locations. The spatial-temporal signature for the first frame corresponds to the second frame rate and includes information associated with the sequence of comparison values.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 1 is a flowchart of the algorithm for charactering and fingerprinting digital video object according to the present invention.

FIG. 2 illustrates the ways of subdividing a frame for computing the Spatial Signatures at multiple resolutions according to the present invention.

FIG. 3 illustrates the process of computing the Base Spatial Signature over 2×2 blocks in a specific embodiment according to present invention.

FIG. 4 illustrates the positioning of a sliding window for computing Temporal Signatures according to present invention.

FIG. 5 illustrates the process of computing the Temporal Signature in a downsampled group of frames in a specific embodiment according to present invention.

FIG. 7 illustrates a process of determining the Base Spatial Signature over 2×2 blocks according to another embodiment of the present invention.

FIG. 8 illustrates a process of determining the Spatial Signature over 4×4 blocks according to another embodiment of the present invention.

FIG. 12 illustrates a process of determining the Spatial-Temporal Signature over 4×4 blocks according to another embodiment of the present invention.

DETAILED DESCRIPTION OF THE INVENTION

Figure 6:
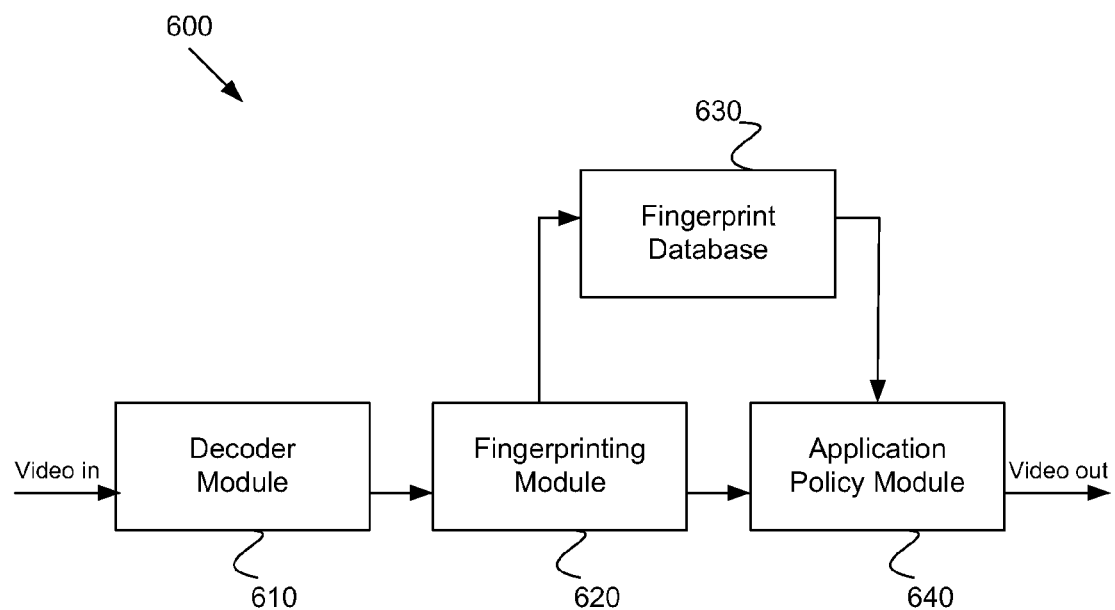
FIG. 6 is a simplified system implementing the method for characterizing and fingerprinting a digital video object according to an embodiment of the present invention.

The present invention covers method and system for characterizing video content by its intrinsic features and transforming these features into a compact signature or fingerprint. Because the same video content may be encoded in different formats, bitrates, or resolutions, and the video content may be cut, edited, or subject to various degree of distortion, it is important that the fingerprint characterizing the video object is robust, to the degree that it is invariant or varying only slightly under these circumstances. On the other hand, the fingerprint must be highly discriminating in the sense that two video objects containing different video content should yield very different fingerprints. Furthermore, the data representation of the video fingerprint must be sufficiently compact for storage, and can be stored in a form for efficient search and matching.

Fingerprinting Video Object

The process of fingerprinting a video object according to the present invention is shown with the block diagram in FIG. 1. Each frame is processed in display order, producing a spatial signature block (SSB), a temporal signature block (TSB), and an optional spatial-temporal signature block (STSB). The SSB consists of one or multiple spatial signatures (SS) in multiple resolutions; the TSB consists of one or multiple temporal signatures (TS) in multiple framerates; the STSB consists of spatial-temporal signatures (STS) in multiple resolutions and multiple framerates. For each frame in a video object, the SSB, TSB, and STSB form a fingerprint block of the corresponding frame. The sequence of all fingerprint blocks in frame order form the fingerprint for the video object. In the following the method for computing SSB, TSB, and STSB is described. In this specific embodiment, all signatures and the fingerprints are computed in Luma component only. In more generalized cases, the signatures and fingerprints can be computed in both Luma and Chroma components, or in any or all components in RGB or other color spaces.

Spatial Signatures

Spatial Signatures (SS) for a video frame can be computed at multiple resolutions. In one implementation according to the present invention, a frame is divided evenly into 2×2 or 4 blocks of equal size, as shown in FIG. 2($a$). This is the lowest resolution for frame subdivision in computing the SS; the resulting SS is called Base Spatial Signature, or BSS. Going up one level in resolution, the frame can be divided into 4×4 or 16 blocks, as shown in FIG. 2($b$). Going up further in resolution by finer frame subdivision, such as 8×8 or 64 blocks, can produce SS in finer resolutions. It is possible to compute the BSS using a different frame subdivision, such as 3×3 or 9 blocks, and extend to higher resolution by successively doubling its dimensions to, e.g., 6×6=36 blocks, and 12×12=144 blocks. But we find that computing BSS using 2×2=4 blocks is more robust against certain image transformations such as an aspect ratio change.

Using the 2×2 block pattern in FIG. 2($a$), the BSS is computed as follows:

1. For each block, compute of mean of pixel value as follows:

$$B_i = (\Sigma x(k))/N_i, k=1, 2, 3, \ldots, N_i,$$

where $B_i$ is the mean pixel value of the i-th block, $x(k)$ is a pixel value inside the i-th block, and $N_i$ is the number of pixels in the i-th block. See an example in FIG. 3($a$).

2. Compare and rank the value of $B_i$ among the blocks and assign the ordinal rank to each block. See an example in FIG. 3($b$).

3. Generate the BSS by collecting the ordinal rank of each block in raster order and forming a BSS vector. See an example in FIG. 3($c$).

The SS at higher resolution can be computed following the same steps as above. The only difference is that the SS vector at a higher resolution has higher dimensions. For example, the BSS vector computed using 2×2 blocks is of dimension 4, while the SS vector computed using 4×4 blocks is of dimension 16.

Since each ordinal rank in 2×2 blocks can be represented with log 2(4)=2 bits, it's easy to see that the BSS can be represented with 4*log 2(4)=8 bits. Similarly, it's easy to see that the SS over 4×4 blocks can be represented with 16*log 2(16)=64 bits. Required bits for representing the SS at even higher resolution can be calculated in a similar way.

The SSB for a frame is formed by stacking the BSS and the SS at all resolutions that are available. In the specific embodiment that is described above, the SSB can be represented with 8+64=72 bits.

Temporal Signatures

The Temporal Signatures (TS) are computed for each frame over a sliding time window.

For each frame, the window is positioned such that the current frame is on the right edge of the window (See FIG. 4). The position of the window is moved one frame at a time along the temporal axis. The size of the window is a parameter that can be adjusted. In one embodiment according to the present invention, the size of the sliding window is defined to be 1 second in time. This means there will be a number of frames falling in the sliding window at any position of the window, and that number depends on the framerate of the video object. For example, if the framerate of a video object is 30 fps, there will be 30 frames in the sliding window at any position of the window. If the framerate of a video object is less than 1 fps, there will be no frame inside the sliding window for any position of the window.

In order to make the TS comparable for video objects of different framerates, the framerate of each video object is downsampled to a set of common framerates. The set of common framerates for a video object to be downsampled to can be adjusted. Generally speaking, they are designed to be representative of the TS at multiple framerates. In one embodiment according to the present invention, the specific set of common framerates that are used to compute the TS is {6 fps, 12 fps, 24 fps}.

Framerate downsampling to the set of common framerates produces multiple groups of frames. The TS is computed over each group of frames, resulting multirate TS. For clarity in this document, the TS computed from a particularly group will be labeled by the downsampled framerate of that group. For example, TS6 indicates that it is the TS computed from the group of frames of 6 fps.

Using the downsample set of {6 fps, 12 fps, 24 fps} and their associated downsampled groups of frames, the TS is computed in the following steps:

1. For each group of frames, compute the sum of absolute difference of corresponding pixels between two consecutive frames in the group, that is, $D_i = \Sigma |x_i(k) - x_{i-1}(k)|, k=1, 2, 3, \ldots N.$ where i is the index for the i-th frame in the group, and k=1, 2, 3, ..., N is the pixel index in a frame. See FIG. 5(a).
2. Compare and rank the value of $D_i$ among the frames in the group and assign the ordinal rank to each frame. See FIG. 5(b).
3. Record the ordinal rank of the current frame (i.e. the frame on the right edge of the sliding window). This is the TS of the current frame in the group. See FIG. 5(b).

Since the ordinal rank is no greater than the number of frames in the group, it is easy to see TS6 can be represented with γ log 2(6)/=3 bits; TS12 can be represented with γ log 2(12)/=4 bits; TS24 can be represented with γ log 2(24)/=5 bits. Here the operator γ] denotes a mathematical ceiling function. For example, γ4.2/=5.

The TSB for a frame is formed by stacking the TS at all framerates that are available. In the specific embodiment that is described above, the TSB can be represented with 3+4+5=12 bits.

Spatial-Temporal Signatures

Spatial-Temporal Signatures (STS) are computed for each frame over a sliding window of subdivided frames. Frames may be subdivided in various ways as described previously for computing the SS at multiple resolutions. In one specific embodiment, the frame is subdivided into 2×2 blocks. The TS is computed for each block in a frame in the same way as described previously, resulting 4 TS per frame for each downsampled group. The STS is formed by collecting the resulting TS in raster order and put them in a vector. The STSB is formed by stacking the STS at all framerates that are available. In this specific embodiment, the STSB can be represented with 4*(3+4+5)=48 bits.

Fingerprint from Spatial and Temporal Signatures

The collection of SSB, TSB, and optionally STSB for a frame form the Fingerprint Block (FB) for the corresponding frame. A sequence of FBs corresponding to each frame in a video object is defined to be the fingerprint for the video object. In the specific embodiment that is described in this document, a FB can be represented with 84 bits without STSB, or 132 bits with STSB. The fingerprint so defined will have a data rate of 2,520 bits/s (3,930 bits/s if STSB included) for video objects with framerate of 30 fps.

As discussed above, FIG. 1 is a simplified method for characterizing and fingerprinting a digital video object according to an embodiment of the present invention. This diagram is merely an example, which should not unduly limit the scope of the claims. One of ordinary skill in the art would recognize many variations, alternatives, and modifications. The method 100 includes a process 110 for receiving video object, a process 120 for obtaining next frame, a process 130 for determining one or more spatial signatures, a process 140 for determining one or more temporal signatures, a process 150 for determining one or more spatial-temporal signatures, a process 160 for storing fingerprint block, and a process 170 for determining whether all frames have been processed. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method are performed by a computer or a processor directed by a code. In another example, some or all processes of the method are performed according to instructions included by a computer-readable medium in a computer program product. Further details of these processes are found throughout the present specification.

After a video object is received at the process 110, the video object is processed. For example, the video object is a piece of video, such as a piece of digital video. In another example, the video object includes one or more frames, which are obtained and processed according to FIG. 1. In one embodiment, the frames are processed in their display order. In another embodiment, for each frame, a spatial signature block (SSB), a temporal signature block (TSB), and/or a spatial-temporal signature block (STSB) are determined. For example, the SSB includes one or more spatial signatures (SS) in one or more resolutions; the TSB includes one or more temporal signatures (TS) in one or more framerates; and/or the STSB includes one or more spatial-temporal signatures (STS) in one or more resolutions and one or more framerates. In yet another embodiment, the SSB, the TSB, and/or the STSB of the same frame form at least part of a fingerprint block of this frame. For example, a fingerprint block is a frame fingerprint. According to FIG. 1, after the fingerprint block is stored, it is determined whether all frames have been processed at the process 170. If not all frames have been processed, next frame is obtained and processed. The sequence of all fingerprint blocks in frame order form at least part of fingerprint for the video object according to an embodiment of the present invention.

Further emphasized here, FIG. 1 is merely an example, which should not unduly limit the scope of the claims. One of ordinary skill in the art would recognize many variations, alternatives, and modifications. For example, the process 170 for determining whether all frames have been processed can be replaced by a process for determining whether additional frames need to be processed. In another example, one or more of the process 130 for determining one or more spatial signatures, the process 140 for determining one or more temporal signatures, and the process 150 for determining one or more spatial-temporal signatures are skipped.

As discussed above, FIG. 2 illustrates examples of subdividing a frame for determining Spatial Signatures at multiple resolutions according to an embodiment of the present invention. FIG. 2 includes FIGS. 2(a) and (b). These diagrams are merely examples, which should not unduly limit the scope of the claims. One of ordinary skill in the art would recognize many variations, alternatives, and modifications.

As shown in FIG. 2(a), a frame is divided into $m_b$ by $n_b$ blocks according to an embodiment. For example, each of $m_b$ and $n_b$ is a positive integer. In another example, $m_b$ and $n_b$ are the same or different in value. In yet another example, all of the $m_b$ by $n_b$ blocks have the same size. As shown in FIG. 2(b), the frame is divided into $m_h$ by $n_h$ blocks according to an embodiment. For example, each of $m_h$ and $n_h$ is a positive integer. In another example, $m_h$ and $n_h$ are the same or different in value. In yet another example, all of the $m_h$ by $n_h$ blocks have the same size.

In one embodiment, the spatial signature (SS) based on $m_b$ by $n_b$ blocks is called Base Spatial Signature (BSS), and the spatial signature (SS) based on $m_h$ by $n_h$ blocks is called Spatial Signature (SS) at higher resolution. For example, $m_h$ is larger than $m_b$, and/or $n_h$ is larger than $n_b$. In another example, both $m_b$ and $n_b$ are equal to 2, and both $m_h$ by $n_h$ are equal to 2 multiplied by $2^n$, where n is a positive integer. In yet another example, both $m_b$ and $n_b$ are equal to 3, and both $m_h$ by $n_h$ are equal to 3 multiplied by $2^n$.

As discussed above, FIG. 3 illustrates a process of determining the Base Spatial Signature over 2×2 blocks according to an embodiment of the present invention. FIG. 3 includes FIGS. 3(a), (b), and (c). These diagrams are merely examples, which should not unduly limit the scope of the claims. One of ordinary skill in the art would recognize many variations, alternatives, and modifications. For example, the BSS based on $m_b$ by $n_b$ blocks can be calculated in substantially the same manner, even if either $m_b$ or $n_b$ or both are not equal to 2. In another example, the SS based on $m_h$ by $n_h$ blocks can be calculated in substantially the same manner.

As shown in FIG. 3, the method for determining spatial signature based on $m_b$ by $n_b$ blocks or $m_h$ by $n_h$ blocks includes the following three processes:

1. For each block, determining average of pixel values as follows:

$$B_i = \sum_{k=1}^{N_i} x(k)/N_i$$

where $B_i$ is the average pixel value of the i-th block, $x(k)$ is the pixel value for the kth pixel inside the i-th block, and $N_i$ is the number of pixels in the i-th block. In one embodiment, $i=1, 2, \ldots, m_b \times n_b$. In another embodiment, $i=1, 2, \ldots, m_h \times n_h$.

2. Determining a ranking number for each block. For example, the value of $B_i$ is compared among the blocks, and the ordinal ranking number for the $B_i$ is assigned to the corresponding block. In one embodiment, the total number of blocks equals $m_b \times n_b$, so the ranking number ranges from 1 to $m_b \times n_b$. In another embodiment, the total number of blocks equals $m_h \times n_h$, so the ranking number ranges from 1 to $m_h \times n_h$.

3. Determining spatial signature based on ranking numbers. For example, the spatial signature is BSS, or SS at higher resolution. In another example, the spatial signature includes a vector. Within the vector, the ranking numbers for the blocks are arranged based on the physical locations of these blocks within the frame. In one embodiment, the ranking numbers are collected in raster order and thus a spatial signature is generated.

After spatial signatures at multiple resolutions are determined for a frame, the SSB is determined by stacking the BSS and the SS at one or more higher resolutions according to an embodiment of the present invention.

FIG. 4 illustrates the positioning of a sliding window for computing Temporal Signatures according to an embodiment of the present invention. This diagram is merely an example, which should not unduly limit the scope of the claims. One of ordinary skill in the art would recognize many variations, alternatives, and modifications.

As shown in FIG. 4, for each frame, the sliding window is positioned such that the current frame is on the right edge of the window. The position of the window is moved one frame at a time along the temporal axis. The width of the window is a parameter that can be adjusted. In one embodiment, the width of the window is 1 second in time. For example, a number of frames fall within the sliding window, and the number of such frames depends on the framerate of the video object. According to one embodiment, if the framerate used for determining temporal signature is the original framerate of the video object, the frame or frames are the original frame or frames of the video object. According to another embodiment, if the framerate used for determining temporal signature is different from the original framerate of the video object, the frame or frames are the sampled frame or frames of the video object. For example, the framerate used for determining temporal signature is lower than the original framerate of the video object, so the video object is temporally downsampled.

For a particular sampled framerate used, the method for determining temporal signature includes the following three processes:

1. Determining differences between a frame and its adjacent frame. For example, the sum of absolute differences of corresponding pixels between two consecutive frames is calculated as follows:

$$D_i = \sum_{k=1}^{N} |x_i(k) - x_{i-1}(k)|$$

where i is the index for a frame. For example, $D_i$ is calculated for each frame within the sliding window. Additionally, k represents the kth pixel and N represents the total number of pixels in the frame.

2. Determining a ranking number for the current frame. For example, the value of $D_i$ are compared among all the frames within the sliding window, and the ordinal ranking number for the $D_i$ is assigned to the corresponding frame. In one embodiment, the ordinal ranking number is assigned to the current frame, which resides at the right edge of the sliding window.

3. Recording the ordinal ranking number of the current frame as the temporal signature of the current frame.

After temporal signatures based on multiple framerates are determined for a frame, the TSB is determined by stacking the TS at multiple framerates according to an embodiment of the present invention.

As discussed above, Spatial-Temporal Signatures (STS) are computed for each frame over a sliding window of subdivided frames according to an embodiment of the present invention. For example, a frame is divided into m by n blocks, where each of m and n is a positive integer. In another example, m and n are the same or different in value. In yet another example, all of the m by n blocks have the same size.

In one embodiment, the TS is computed for each block in the frame. For a particular sampled framerate used, the method for determining temporal signature for each block includes the following two processes:

1. Determining differences between a block on a frame and its corresponding block on an adjacent frame. According to one embodiment, if the framerate used for determining temporal signature is the original framerate of the video object, the frames are the original frames of the video object. According to another embodiment, if the framerate used for determining temporal signature is different from the original framerate of the video object, the frames are the sampled frames of the video object. For example, the framerate used for determining temporal signature is lower than the original framerate of the video object, so the video object is temporally downsampled.

For example, the sum of absolute differences of corresponding pixels between two corresponding blocks on two consecutive frames is calculated as follows:

$$D_i = \sum_{k=1}^{N} |x_i(k) - x_{i-1}(k)|$$

where i is the index for a frame. For example, $D_i$ is calculated for the corresponding block of each frame within the sliding window. Additionally, k represents the kth pixel within the corresponding block, and N represents the total number of pixels in the block.

2. Determining a ranking number for the block on the current frame. For example, the value of $D_i$ are compared among all the corresponding blocks on all the frames within the sliding window, and the ordinal ranking number for the $D_i$ is assigned to the corresponding block. In one embodiment, the ordinal ranking number is assigned to the block on the current frame, which resides at the right edge of the sliding window.

These two processes are repeated to determine the ordinal ranking numbers for all m-by-n blocks on the current frame according to an embodiment. The spatial-temporal signature is then determined based on ranking numbers of blocks on the current frame. For example, the spatial-temporal signature includes a vector. Within the vector, the ranking numbers for the blocks are arranged based on the physical locations of these blocks within the current frame. In one embodiment, the ranking numbers are collected in raster order and thus a spatial-temporal signature is generated.

As discussed, the spatial-temporal signature is determined based on the framerate used for determining the TS for each block of the current frame. In one embodiment, spatial-temporal signatures are determined based on multiple framerates for the current frame, and the STSB is determined by stacking the STS at multiple framerates according to an embodiment of the present invention.

For each frame, one or more of SSB, TSB, and STSB, with or without any other information, can form the Fingerprint Block (FB) for the corresponding frame according to an embodiment of the present invention. For example, a Fingerprint Block (FB) is a frame fingerprint, which includes one or more spatial signatures, one or more temporal signatures, and/or one or more spatial-temporal signatures. For a sequence of frames of a video object, the corresponding sequence of FBs can be used as the fingerprint for the video object according to another embodiment of the present invention. For example, if the framerate used for determining temporal signature is the original framerate of the video object, the frames are the original frames of the video object. According to another embodiment, if the framerate used for determining temporal signature is different from the original framerate of the video object, the frames are the sampled frames of the video object. The fingerprint of the video object is stored in a database according to an embodiment of the present invention. For example, the database includes one or more fingerprints of one or more corresponding video objects.

FIG. 6 is a simplified system implementing the method 100 for characterizing and fingerprinting a digital video object according to an embodiment of the present invention. This diagram is merely an example, which should not unduly limit the scope of the claims. One of ordinary skill in the art would recognize many variations, alternatives, and modifications. The system 600 includes a decoder module 610, a fingerprinting module 620, a fingerprint database 630, and an application policy module 640. Although the above has been shown using a selected group of components for the system, there can be many alternatives, modifications, and variations. For example, some of the modules may be expanded and/or combined. Other modules may be inserted to those noted above. Depending upon the embodiment, the arrangement of modules may be interchanged with others replaced. As an example, some or all processes of the method are performed by a computer or a processor directed by a code. In another example, some or all processes of the method are performed according to instructions included by a computer-readable medium in a computer program product. Further details of these processes are found throughout the present specification.

As shown in FIG. 6, an input video is decoded by the decoder module 610 and fed to the fingerprinting module 620. The fingerprinting module 620 performs the method 100 according to an embodiment of the present invention. For example, the fingerprinting module 620 is implemented according to FIGS. 1, 2, 3, 4, and/or 5. The resulting video fingerprint is compared to the ones stored in the fingerprint database for identification, and the identification result is returned to the application along with associated metadata (e.g., title and ownership of the video content). Based on the identification result, the application applies certain policy at the application policy module 640. For example, if the video is identified to be a pirated version or copy, the application applies filtering.

As discussed above and further emphasized here, FIG. 6 is merely an example, which should not unduly limit the scope of the claims. One of ordinary skill in the art would recognize many variations, alternatives, and modifications. For example, anyone of the modules 610, 620, 630, and 640 can be either hardware or software, or a combination of hardware and software. In another example, the fingerprint database 630 can be embedded in an application or resided outside the application on a local hard drive or a remote server.

According to another embodiment of the present invention, a method for generating a fingerprint for a video object includes obtaining a plurality of frames associated with a video object. Additionally, the method includes, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponding to a plurality of frame rates respectively. Moreover, the method includes, for each of the plurality of frames, processing information associated with the plurality of spatial signatures and the plurality of temporal signatures, and determining a frame fingerprint for the each of the plurality of frames, the frame fingerprint including the plurality of spatial signatures corresponding to the plurality of resolutions respectively and the plurality of temporal signatures corresponding to the plurality of frame rates respectively. Also, the method includes processing a plurality of frame fingerprints for the plurality of frames respectively, the plurality of frame fingerprints including the frame fingerprint for the each of the plurality of frames. Additionally, the method includes determining a video fingerprint for the video object, the video fingerprint including the plurality of frame fingerprints. For example, the method is implemented according to FIGS. 1, 2, 3, 4, and/or 5.

According to yet another embodiment of the present invention, a method for generating a spatial signature for a frame of a video object includes obtaining a frame associated with a video object, and dividing the frame into a plurality of blocks, the plurality of blocks corresponding to a plurality of locations respectively. Each of the plurality of blocks includes a plurality of pixels, and the plurality of pixels corresponds to a plurality of pixel values respectively. Additionally, the method includes determining a plurality of average pixel values for the plurality of blocks respectively, processing the plurality of average pixel values, and determining a plurality of ranks for the plurality of blocks respectively based on at least information associated with the plurality of average pixel values. Each of the plurality of ranks corresponds to a block. Moreover, the method includes processing information associated with the plurality of ranks, and determining a sequence of ranks based on at least information associated with the plurality of ranks and the plurality of locations. A spatial signature for the frame includes information associated with the sequence of ranks. For example, the method is implemented according to FIGS. 1, 2, and/or 3.

According to yet another embodiment of the present invention, a method for generating a temporal signature for a frame of a video object includes obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the method includes processing information associated with the first plurality of frames, and determining a plurality of difference values for the first plurality of frames respectively. Each of the plurality of difference values corresponds to the each of the first plurality of frames and the adjacent frame. Moreover, the method includes processing information associated with the plurality of difference values, and determining a plurality of ranks corresponding to the first plurality of frames respectively based on at least information associated with the plurality of difference values. The plurality of ranks includes a rank corresponding to the frame, and the rank is a temporal signature for the frame. For example, the method is implemented according to FIGS. 1, 4, and/or 5.

According to yet another embodiment of the present invention, a method for generating a spatial-temporal signature for a frame of a video object includes obtaining a first plurality of frames associated with a video object. The first plurality of frames includes at least a frame, and each of the first plurality of frames corresponds to an adjacent frame. Additionally, the method includes dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the method includes processing information associated with the first plurality of frames. Also, the method includes, for each of the first plurality of blocks, determining a plurality of difference values for the second plurality of blocks respectively. Each of the plurality of difference values is associated with the each of the second plurality of blocks and a corresponding block on the adjacent frame. Additionally, the method includes, for each of the first plurality of blocks, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Moreover, the method includes processing information associated with a second plurality of ranks corresponding to the first plurality of blocks respectively, and determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks. For example, the method is implemented according to FIGS. 1, 2, 3, 4, and/or 5.

According to yet another embodiment of the present invention, a computer program product includes a computer readable medium including instructions for generating a fingerprint for a video object. The computer readable medium includes one or more instructions for obtaining a plurality of frames associated with a video object. Additionally, the computer readable medium includes one or more instructions for, for each of the plurality of frames, processing information associated with the plurality of frames, determining a plurality of spatial signatures for the each of the plurality of frames based on at least information associated with the each of the plurality of frames, and determining a plurality of temporal signatures for the each of the plurality of frames based on at least information associated with the plurality of frames. The plurality of spatial signatures corresponds to a plurality of resolutions respectively, and the plurality of temporal signatures corresponds to a plurality of frame rates respectively. Moreover, the one or more instructions are for, for each of the plurality of frames, processing information associated with the plurality of spatial signatures and the plurality of temporal signatures, and determining a frame fingerprint for the each of the plurality of frames. The frame fingerprint includes the plurality of spatial signatures corresponding to the plurality of resolutions respectively and the plurality of temporal signatures corresponding to the plurality of frame rates respectively. Also, the computer readable medium includes one or more instructions for processing a plurality of frame fingerprints for the plurality of frames respectively, and one or more instructions for determining a video fingerprint for the video object. The plurality of frame fingerprints includes the frame fingerprint for the each of the plurality of frames, and the video fingerprint includes the plurality of frame fingerprints. For example, the computer program product is implemented according to FIGS. 1, 2, 3, 4, 5 and/or 6.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively, one or more instructions for processing the plurality of average pixel values, and one or more instructions for determining a plurality of ranks for the plurality of blocks respectively based on at least information associated with the plurality of average pixel values, each of the plurality of ranks corresponding to a block. Moreover, the computer readable medium includes one or more instructions for processing information associated with the plurality of ranks, and one or more instructions for determining a sequence of ranks based on at least information associated with the plurality of ranks and the plurality of locations. A spatial signature for the frame includes information associated with the sequence of ranks. For example, the computer program product is implemented according to FIGS. 1, 2, 3, and/or 6.

According to yet another embodiment of the present invention, a computer program product includes a computer readable medium including instructions for generating a temporal signature for a frame of a video object. The computer readable medium includes one or more instructions for obtaining a first plurality of frames associated with a video object. The first plurality of frames includes at least a frame, each of the first plurality of frames includes a first plurality of pixels and corresponds to an adjacent frame, and the adjacent frame includes a second plurality of pixels. Additionally, the computer readable medium includes one or more instructions for processing information associated with the first plurality of frames, and one or more instructions for determining a plurality of difference values for the first plurality of frames respectively. Each of the plurality of difference values corresponding to the each of the first plurality of frames and the adjacent frame. Moreover, the computer readable medium includes one or more instructions for processing information associated with the plurality of difference values, and one or more instructions for determining a plurality of ranks corresponding to the first plurality of frames respectively based on at least information associated with the plurality of difference values. The plurality of ranks includes a rank corresponding to the frame, and the rank is a temporal signature for the frame. For example, the computer program product is implemented according to FIGS. 1, 4, 5 and/or 6.

According to yet another embodiment of the present invention, a computer program product includes a computer readable medium including instructions for generating a spatial-temporal signature for a frame of a video object. The computer readable medium includes one or more instructions for obtaining a first plurality of frames associated with a video object. The first plurality of frames includes at least a frame, and each of the first plurality of frames corresponds to an adjacent frame. Additionally, the computer readable medium includes one or more instructions for dividing each of the first plurality of frames. The divided frame includes a first plurality of blocks corresponding to a plurality of locations respectively, each of the first plurality of blocks corresponds to a second plurality of blocks including the each of the first plurality of blocks, and the second plurality of blocks is associated with blocks on the first plurality of frames respectively. Moreover, the computer readable medium includes one or more instructions for processing information associated with the first plurality of frames. Also, the computer readable medium includes one or more instructions for, for each of the first plurality of blocks, determining a plurality of difference values for the second plurality of blocks respectively, processing information associated with the plurality of difference values, determining a first plurality of ranks corresponding to the second plurality of blocks respectively based on at least information associated with the plurality of difference values, processing information associated with the first plurality of ranks, and determining a rank for the each of the first plurality of blocks based on at least information associated with the first plurality of ranks. Each of the plurality of difference values is associated with the each of the second plurality of blocks and a corresponding block on the adjacent frame. Additionally, the computer readable medium includes one or more instructions for processing information associated with a second plurality of ranks corresponding to the first plurality of blocks respectively, and one or more instructions for determining a sequence of ranks based on at least information associated with the second plurality of ranks and the plurality of locations for the first plurality of blocks. The second plurality of ranks includes the rank, and a spatial-temporal signature for the frame includes information associated with the sequence of ranks. For example, the computer program product is implemented according to FIGS. 1, 2, 3, 4, 5 and/or 6.

The present invention has various advantages. Certain embodiments of the present invention can generate a robust fingerprint which either does not change or change only slightly with different formats, bitrates, or resolutions, and/or with certain alterations and/or distortions for the same video object. Some embodiments of the present invention can generate a fingerprint that is highly discriminating so that two video objects containing different video contents would yield significantly different fingerprints. Certain embodiments of the present invention can generate a fingerprint that is compact for storage, and can be stored in a form for efficient search and matching.

FIG. 7 illustrates a process of determining the Base Spatial Signature over 2×2 blocks according to another embodiment of the present invention. FIG. 7 includes FIGS. 7(a), (b), and (c). These diagrams are merely examples, which should not unduly limit the scope of the claims. One of ordinary skill in the art would recognize many variations, alternatives, and modifications. For example, the BSS based on $m_b$ by $n_b$ blocks can be calculated in substantially the same manner, even if either $m_b$ or $n_b$ or both are not equal to 2. In another example, the SS based on $m_h$ by $n_h$ blocks can be calculated in substantially the same manner.

According to one embodiment, some or all processes as illustrated in FIGS. 7(a), (b) and (c) are performed by a computer or a processor directed by a code. According to another embodiment, some or all processes as illustrated in FIG. 7(a), (b) and (c) are performed according to instructions included by a computer-readable medium in a computer program product.

As shown in FIG. 7, the method for determining spatial signature based on $m_b$ by $n_b$ blocks or $m_h$ by $n_h$ blocks includes the following three processes:

1. For each block, determining average of pixel values as follows:

$$A_{i,j} = \sum_{k=1}^{N_{i,j}} x(k)/N_{i,j}$$

where $A_{i,j}$ is the average pixel value of the block designated with (i, j), x(k) is the pixel value for the kth pixel inside the block designated with (i, j), and $N_{i,j}$ is the number of pixels in the block designated with (i, j). In one embodiment, i=1, 2, ..., $m_b$; and j=1, 2, ..., $n_b$. In another embodiment, i=1, 2, ..., $m_h$; and j=1, 2, ..., $n_h$. For example, $A_{1,1}$=86, $A_{1,2}$=176, $A_{2,1}$=112, and $A_{2,2}$=145, as shown in FIG. 7(a).

2. Determining a pair of comparison values for each block.

According to one embodiment, for the block designated with (i, j), its pair of comparison values is represented by ($q_{i,j}$, $r_{i,j}$). For example, $q_{i,j}$ is determined by a comparison between $A_{i,j}$ and $A_{i,j+1}$, and $r_{i,j}$ is determined by a comparison between $A_{i,j}$ and $A_{i+1,j}$.

Depending on the application, multiple directions may be used in determining comparison values based on horizontal, vertical, diagonal, and/or other directions. For example, the comparison values ($q_{i,j}$, $r_{i,j}$) respectively represent horizontal and vertical directions.

In one embodiment, if $A_{i,j} < A_{i,j+1}$, $q_{i,j}$ is equal to 1; otherwise, $q_{i,j}$ is equal to 0. If the block designated as (i, j+1) does not exist, $q_{i,j}$ is assigned to a constant U. For example, U is equal to 1. In another example, U is equal to 0. According to another embodiment, if $A_{i,j} < A_{i+1,j}$, $r_{i,j}$ is equal to 1; otherwise, $r_{i,j}$ is equal to 0. If the block designated as (i+1, j) does not exist, $r_{i,j}$ is assigned to a constant V. For example, V is equal to 1. In another example, V is equal to 0.

According to one embodiment, as shown in FIG. 7(b), for the block designated with (1, 1), its pair of comparison values is (1,1); for the block designated with (1, 2), its pair of comparison values is (U,0); for the block designated with (2, 1), its pair of comparison values is (1,V); for the block designated with (2, 2), its pair of comparison values is (U,V). For example, U is equal to 0, and V is also equal to 0.

In another embodiment, if $A_{i,j} < A_{i,j+1}$, $q_{i,j}$ is equal to 1; otherwise, $q_{i,j}$ is equal to 0. If the block designated with (i,j+1) does not exist, $A_{i,j+1}$ is replaced by $A_{i,1}$. For example, if $A_{i,j} < A_{i,1}$, $q_{i,j}$ is equal to 1; otherwise, $q_{i,j}$ is equal to 0. According to another embodiment, if $A_{i,j} < A_{i+1,j}$, $r_{i,j}$ is equal to 1; otherwise, $r_{i,j}$ is equal to 0. If the block designated with (i+1, j) does not exist, $A_{i+1,j}$ is replaced by $A_{1,j}$. For example, if $A_{i,j} < A_{1,j}$, $r_{i,j}$ is equal to 1; otherwise, $r_{i,j}$ is equal to 0.

According to another embodiment, as shown in FIG. 7(b), for the block designated with (1, 1), its pair of comparison values is (1,1); for the block designated with (1, 2), its pair of comparison values is (0,0); for the block designated with (2, 1), its pair of comparison values is (1,0); for the block designated as (2, 2), its pair of comparison values is (0,1).

3. Determining spatial signature based on pairs of comparison values. For example, the spatial signature is BSS, or SS at higher resolution. In another example, the spatial signature includes a vector. Within the vector, the comparison values for the blocks are arranged based on the physical locations of these blocks within the frame.

In one embodiment, the comparison values are collected based on raster scan and thus a spatial signature is generated. For example, as shown in FIG. 7(c), the spatial signature is a vector ($q_{1,1}$, $r_{1,1}$, $q_{1,2}$, $r_{1,2}$, $q_{2,1}$, $r_{2,1}$, $q_{2,2}$, $r_{2,2}$). In another embodiment, the comparison values are collected based on onion scan and thus a spatial signature is generated.

The onion scan is an outward or inward layered scan of pixels. A single layer is selected and scan at a time. In an outward scan, scan is performed from inner layers to outer layers. In an inward scan, scan is performed from outer layers to inner layers. For each layer, the scan direction can be clockwise or counter-clockwise.

In an onion scan process, for each N×N blocks, there are N/2 layers. In an exemplary outward scanning process, onion scan is performed on a layer-by-layer basis, starting from layer 1 until layer N/2 is processed. The layer boundary and the scan thereof are provided below:

Layer 1 is bounded by (N/2, N/2) and (N/2+1, N/2+1). A clockwise scan is performed in a sequence of (N/2, N/2), (N/2, N/2+1), (N/2+1, N/2+1), (N/2+1, N/2). Alternatively, if a counter-clockwise scan is performed, a sequence of (N/2, N/2), (N/2+1, N/2), (N/2+1, N/2+1), (N/2, N/2+1) is used.

Layer 2 is bounded by (N/2−1, N/2−1) and (N/2+2, N/2+2). A clockwise scan is performed in a sequence of (N/2−1, N/2−1), (N/2−1, N/2), (N/2−1, N/2+1), (N/2−1, N/2+2), (N/2, N/2+2), (N/2+1, N/2+2), (N/2+2, N/2+2), (N/2+2, N/2+1), (N/2+2, N/2), (N/2+2, N/2−1), (N/2+1, N/2−1), (N/2, N/2−1).

The layer by layer process continues until it reaches layer N/2, which is bounded by (1, 1), (N, N). A clockwise scan is performed in a sequence of:

(1, 1), (1, 2), ... (1, N)
(2, N), (3, N), ... (N,N)
(N, N−1), (N, N−2), ... (N, 1)
(N−1, 1), (N−2, 1), ... (N−1, 2)

As another example, in an inward scanning process, the layer N/2 is scanned first, the layer N/2−1 is scanned next, and layer 1 is scanned at last.

Using the onion scan, comparison values are collected and used to generate a spatial signature. For example, as shown in FIG. 7(c), the spatial signature is a vector ($q_{1,1}$, $r_{1,1}$, $q_{1,2}$, $r_{1,2}$, $q_{2,2}$, $r_{2,2}$, $q_{2,1}$, $r_{2,1}$).

FIG. 8 illustrates a process of determining the Spatial Signature over 4×4 blocks according to another embodiment of the present invention. This diagram is merely an example, which should not unduly limit the scope of the claims. One of ordinary skill in the art would recognize many variations, alternatives, and modifications. For example, some or all processes as illustrated in FIG. 8 are performed by a computer or a processor directed by a code. In another example, some or all processes as illustrated in FIG. 8 are performed according to instructions included by a computer-readable medium in a computer program product.

In one embodiment, the comparison values are collected based on raster scan, and thus the generated spatial signature is a vector ($q_{1,1}$, $r_{1,1}$, $q_{1,2}$, $r_{1,2}$, $q_{1,3}$, $r_{1,3}$, $q_{1,4}$, $r_{1,4}$, $q_{2,1}$, $r_{2,1}$, $q_{2,2}$, $r_{2,2}$, $q_{2,3}$, $r_{2,3}$, $q_{2,4}$, $r_{2,4}$, $q_{3,1}$, $r_{3,1}$, $q_{3,2}$, $r_{3,2}$, $q_{3,3}$, $r_{3,3}$, $q_{3,4}$, $r_{3,4}$, $q_{4,1}$, $r_{4,1}$, $q_{4,2}$, $r_{4,2}$, $q_{4,3}$, $r_{4,3}$, $q_{4,4}$, $r_{4,4}$). In another embodiment, the comparison values are collected based on onion scan and thus the generated spatial signature is a vector ($q_{1,1}$, $r_{1,1}$, $q_{1,2}$, $r_{1,2}$, $q_{1,3}$, $r_{1,3}$, $q_{1,4}$, $r_{1,4}$, $q_{2,4}$, $r_{2,4}$, $q_{3,4}$, $r_{3,4}$, $q_{4,4}$, $r_{4,4}$, $q_{4,3}$, $r_{4,3}$, $q_{4,2}$, $r_{4,2}$, $q_{4,1}$, $r_{4,1}$, $q_{3,1}$, $r_{3,1}$, $q_{2,1}$, $r_{2,1}$, $q_{2,2}$, $r_{2,2}$, $q_{2,3}$, $r_{2,3}$, $q_{3,3}$, $r_{3,3}$, $q_{3,2}$, $r_{3,2}$).

After spatial signatures at multiple resolutions are determined for a frame, the SSB is determined by stacking the BSS and the SS at one or more higher resolutions according to an embodiment of the present invention.

Figure 9:
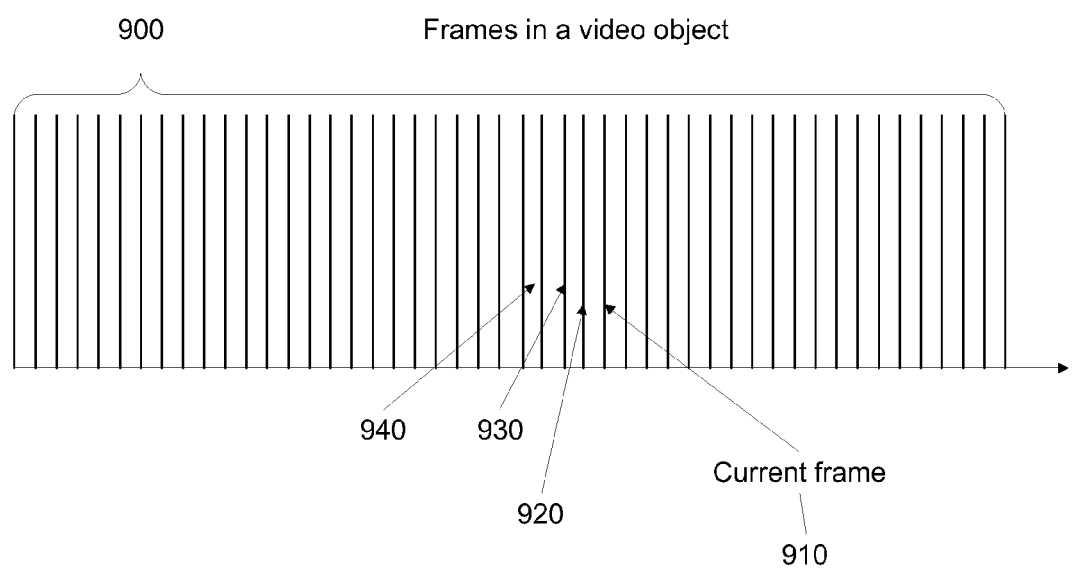
FIG. 9 illustrates a current frame and its adjacent frames for computing temporal signatures respectively according to another embodiment of the present invention.

FIG. 9 illustrates a current frame and its adjacent frames for computing temporal signatures respectively according to another embodiment of the present invention. This diagram is merely an example, which should not unduly limit the scope of the claims. One of ordinary skill in the art would recognize many variations, alternatives, and modifications. For example, some or all processes as illustrated in FIG. 9 are performed by a computer or a processor directed by a code. In another example, some or all processes as illustrated in FIG. 9 are performed according to instructions included by a computer-readable medium in a computer program product.

As shown in FIG. 9, a video object includes a plurality of original frames 900. For each of the plurality of original frames 900, its one or more temporal signatures are determined according to an embodiment of the present invention. For example, the one or more temporary signatures correspond to one or more framerates for determining temporary signatures respectively. In another example, the original frame for which one or more temporary signatures are being determined is called a current frame 910.

According to one embodiment, for the current frame, an adjacent frame needs to be determined based on the framerate for determining the temporary signature. If the framerate used for determining the temporal signature is equal to the original framerate of the video object, the adjacent frame is an original frame immediately next to the current frame. For example, the adjacent frame for the frame 901 is the previous frame 920.

If the framerate used for determining the temporal signature is lower than the original framerate of the video object, a downsampling is performed such that the closest original frame is found that can best satisfy the framerate used for determining the temporary signature, and the determined closest original frame is used as the adjacent frame.

As shown in FIG. 9, for example, if the framerate used for determining the temporal signature is 0.50 multiplied by the original framerate of the video object, the adjacent frame for the frame 910 is the previous frame 930. In another example, if the framerate used for determining the temporal signature is 0.48 multiplied by the original framerate of the video object, the adjacent frame for the frame 910 is the previous frame 930. In yet another example, if the framerate used for determining the temporal signature is 0.40 multiplied by the original framerate of the video object, the adjacent frame for the frame 910 is the previous frame 930. In yet another example, if the framerate used for determining the temporal signature is 0.38 multiplied by the original framerate of the video object, the adjacent frame for the frame 910 is the previous frame 940.

For a particular framerate for determining the temporary signature, according to one embodiment, the method for determining the temporal signature includes the following processes:

1. Determining an adjacent frame for a current frame. In one embodiment, the adjacent frame is a previous frame with respect to the current frame. At least one such example is illustrated in FIG. 9, as discussed above. In another example, if the current frame is an early frame among the plurality of original frames of the video object, the adjacent frame that is also a previous frame cannot be determined.

2. Determining a normalized difference between the current frame and its adjacent frame. For example, the sum of absolute differences of corresponding pixels between the current frame and the adjacent frame is calculated as follows:

$$E_i = \sum_{k=1}^{N} |x_i(k) - x_a(k)|$$

where i is the index for the current frame. $x_i(k)$ is the pixel value for the kth pixel inside the current frame, and $x_a(k)$ is the pixel value for the kth pixel inside the adjacent frame. $E_i$ represents the sum of absolute differences of corresponding pixels between the current frame and the adjacent frame, and N represents the total number of pixels in each of the current frame and the adjacent frame. For example, the adjacent frame is a previous frame with respect to the current frame.

In another example, the normalized differences between the current frame and its adjacent frame can be determined as follows:

$$F_i = \frac{E_i}{N}$$

where $F_i$ represents the normalized differences between the current frame and its adjacent frame, and N represents the total number of pixels in each of the current frame and the adjacent frame.

3. Performing quantization of normalized difference between the current frame and its adjacent frame. In one embodiment, the quantization of normalized difference is performed by dividing the normalized difference by a constant M, and the quotient of such division (e.g., an integer difference) is used and/or recorded as the temporal signature for the current frame. For example, if $F_i$ is equal to 9, and M is equal to 2, the temporal signature for the current frame is 4.

As discussed above, in some embodiments, if the current frame is an early frame among the plurality of original frames of the video object, the adjacent frame that is also a previous frame cannot be determined. If the adjacent frame cannot be determined, the temporal signature for the current frame is assigned with a predetermined integer.

After temporal signatures based on multiple framerates are determined for a current frame, the TSB is determined by stacking the TS at multiple framerates according to an embodiment of the present invention.

Figure 10:
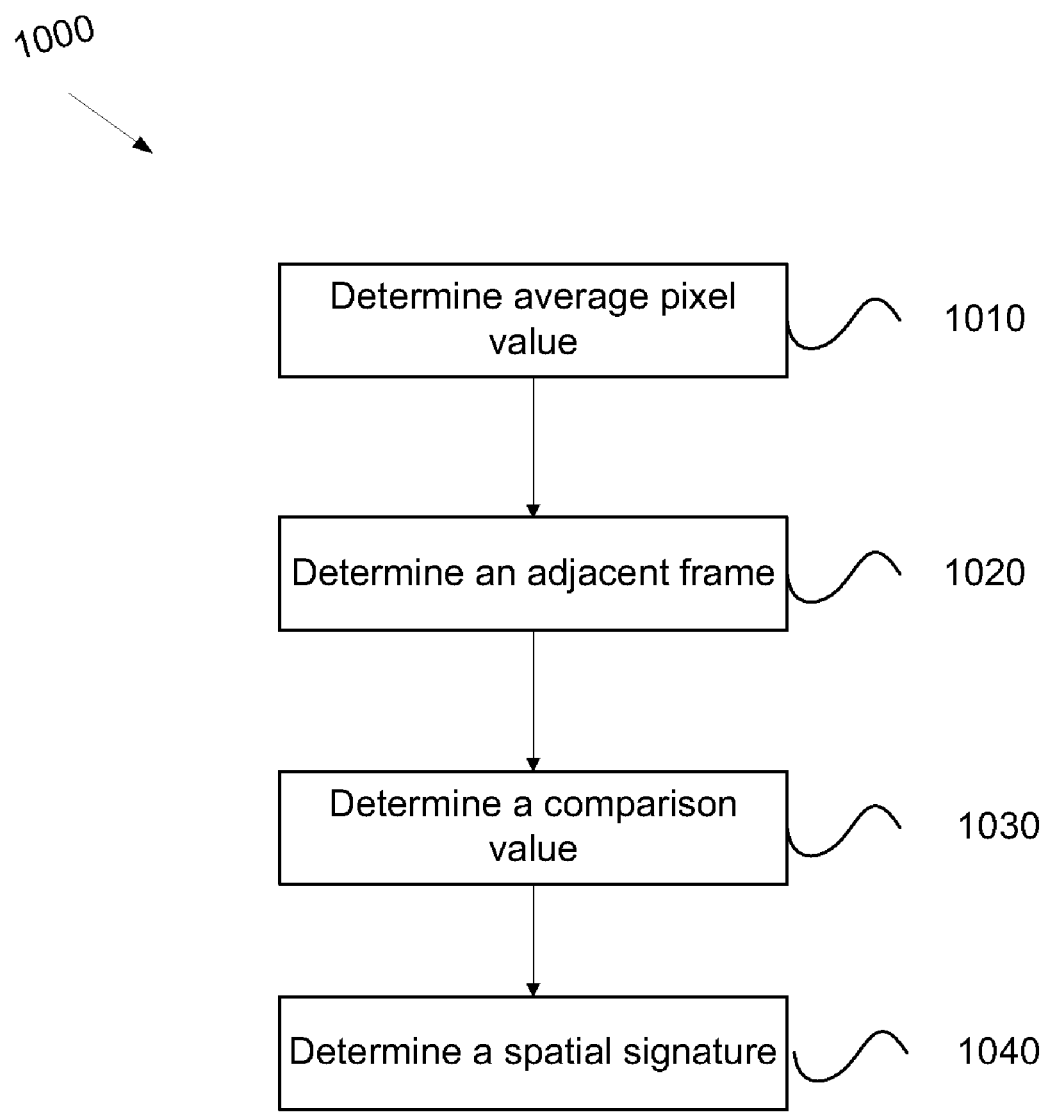
FIG. 10 is a simplified method for determining the Spatial-Temporal Signatures (STS) according to another embodiment of the present invention.

FIG. 10 is a simplified method for determining the Spatial-Temporal Signatures (STS) according to another embodiment of the present invention. This diagram is merely an example, which should not unduly limit the scope of the claims. One of ordinary skill in the art would recognize many variations, alternatives, and modifications. A method 1000 includes process 1010 for determining an average of pixel values for each block of a current frame, process 1020 for determining an adjacent frame for the current frame, process 1030 for determining a comparison value for each block of the current frame, process 1040 for determining spatial-temporal signature based on comparison values for the current frame. Although the above has been shown using a selected group of processes for the method 1000, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification and more particularly below.

According to one embodiment, some or all processes as illustrated in FIG. 10 are performed by a computer or a processor directed by a code. According to another embodiment, some or all processes as illustrated in FIG. 10 are performed according to instructions included by a computer-readable medium in a computer program product.

At the process 1010, an average of pixel values is determined for each block of a current frame. For example, a video object includes a plurality of original frames. For each of the plurality of original frames, its one or more spatial-temporal signatures are determined according to an embodiment of the present invention. For example, the one or more temporary signatures correspond to one or more framerates for determining spatial-temporary signatures respectively. In another example, the original frame for which one or more spatial-temporary signatures are being determined is called a current frame. In one embodiment, the current frame is divided into $m_b$ by $n_b$ blocks. In another embodiment, the current frame is divided into $m_h$ by $n_h$ blocks.

According to one embodiment, for each block, the average of pixel values is determined as follows:

$$A_{i,j,c} = \sum_{k=1}^{N_{i,j,c}} x_c(k)/N_{i,j,c}$$

where $A_{i,j,c}$ is the average pixel value of the block designated with (i, j) for the current frame. $x_c(k)$ is the pixel value for the kth pixel inside the block designated with (i, j) for the current frame, and $N_{i,j,c}$ is the number of pixels in the block designated with (i, j) for the current frame. In one embodiment, i=1, 2, . . . , $m_b$; and j=1, 2, . . . , $n_b$. In another embodiment, i=1, 2, . . . , $m_h$; and j=1, 2, . . . , $n_h$.

At the process 1020, an adjacent frame is determined for the current frame. For example, the adjacent frame needs to be determined based on the framerate for determining the spatial-temporary signature. If the framerate used for determining the spatial-temporal signature is equal to the original framerate of the video object, the adjacent frame is an original frame immediately next to the current frame. If the framerate used for determining the spatial-temporal signature is lower than the original framerate of the video object, a downsampling is performed such that the closest original frame is found that can best satisfy the framerate used for determining the spatial-temporary signature, and the determined closest original frame is used as the adjacent frame.

In one embodiment, the adjacent frame is divided into blocks in the same way as the current frame. In another embodiment, for each block, the average of pixel values is determined as follows:

$$A_{i,j,a} = \sum_{k=1}^{N_{i,j,a}} x_a(k)/N_{i,j,a}$$

where $A_{i,j,a}$ is the average pixel value of the block designated with (i, j) for the adjacent frame. $x_a(k)$ is the pixel value for the kth pixel inside the block designated with (i, j) for the adjacent frame, and $N_{i,j,a}$ is the number of pixels in the block designated with (i, j) for the adjacent frame. In one embodiment, i=1, 2, . . . , $m_b$; and j=1, 2, . . . , $n_b$. In another embodiment, i=1, 2, . . . , $m_h$; and j=1, 2, . . . , $n_h$.

In one embodiment, the adjacent frame is a previous frame with respect to the current frame. For example, the process 1020 is substantially similar to what is illustrated in FIG. 9, by replacing the framerate used for determining the temporal signature with the framerate used for determining the spatial-temporal signature. In another example, if the current frame is an early frame among the plurality of original frames of the video object, the adjacent frame that is also a previous frame cannot be determined.

At the process 1030, a comparison value is determined for each block of the current frame. According to one embodiment, for the block designated with (i, j), its comparison value is represented by $s_{i,j}$. For example, $s_{i,j}$ is determined by a comparison between $A_{i,j,c}$ of the current frame and $A_{i,j,a}$ of the adjacent frame.

In one embodiment, if $A_{i,j,c} > A_{i,j,a}$, $s_{i,j}$ is equal to 1; otherwise, $s_{i,j}$ is equal to 0. In another embodiment, as discussed above, if the current frame is an early frame among the plurality of original frames of the video object, the adjacent frame that is also a previous frame cannot be determined. If the adjacent frame cannot be determined, $s_{i,j}$ for the current frame is assigned with a predetermined integer.

At the process 1040, the spatial-temporal signature is determined based on comparison values for the current frame. For example, the spatial-temporal signature includes a vector. Within the vector, the comparison values for the blocks are arranged based on the physical locations of these blocks within the current frame. In one embodiment, the comparison values are collected based on raster scan and thus a spatial-temporal signature is generated. In another embodiment, the comparison values are collected based on onion scan and thus a spatial signature is generated.

Figure 11:
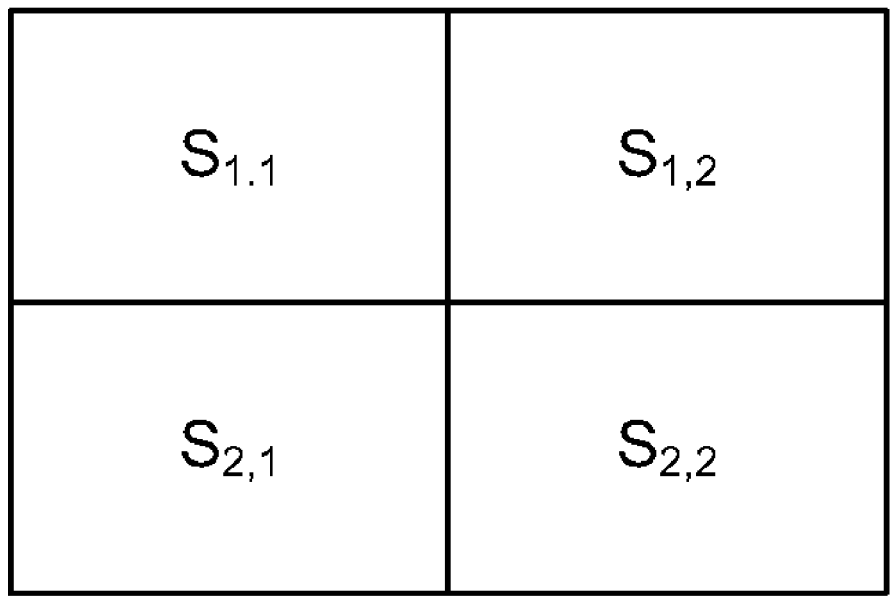
FIG. 11 illustrates a process of determining the Spatial-Temporal Signature over 4×4 blocks according to another embodiment of the present invention.

FIG. 11 illustrates a process of determining the Spatial-Temporal Signature over 4×4 blocks according to another embodiment of the present invention. This diagram is merely an example, which should not unduly limit the scope of the claims. One of ordinary skill in the art would recognize many variations, alternatives, and modifications. For example, based on raster scan, the spatial signature is a vector ($s_{1,1}$, $s_{1,2}$, $s_{2,1}$, $s_{2,2}$). In another example, based on onion scan, the spatial signature is a vector ($s_{1,1}$, $s_{1,2}$, $s_{2,2}$, $s_{2,1}$). As explained above, depending on the application the onion scan may be performed in various ways, inward or outward, clockwise or counterclockwise.

According to one embodiment, some or all processes as illustrated in FIG. 11 are performed by a computer or a processor directed by a code. According to another embodiment, some or all processes as illustrated in FIG. 11 are performed according to instructions included by a computer-readable medium in a computer program product.

FIG. 12 illustrates a process of determining the Spatial-Temporal Signature over 4×4 blocks according to another embodiment of the present invention. This diagram is merely an example, which should not unduly limit the scope of the claims. One of ordinary skill in the art would recognize many variations, alternatives, and modifications.

In one embodiment, the comparison values are collected based on raster scan, and thus the generated spatial-temporal signature is a vector ($s_{1,1}$, $s_{1,2}$, $s_{1,3}$, $s_{1,4}$, $s_{2,1}$, $s_{2,2}$, $s_{2,3}$, $s_{2,4}$, $s_{3,1}$, $s_{3,2}$, $s_{3,3}$, $s_{3,4}$, $s_{4,1}$, $s_{4,2}$, $s_{4,3}$, $s_{4,4}$). In another embodiment, the comparison values are collected based on onion scan and thus the generated spatial-temporal signature is a vector ($s_{1,1}$, $s_{1,2}$, $s_{1,3}$, $s_{1,4}$, $s_{2,4}$, $s_{3,4}$, $s_{4,4}$, $s_{4,3}$, $s_{4,2}$, $s_{4,1}$, $s_{3,1}$, $s_{2,1}$, $s_{2,2}$, $s_{2,3}$, $s_{3,3}$, $s_{3,2}$). As explained above, depending on the application the onion scan may be performed in various ways, inward or outward, clockwise or counterclockwise.

For example, some or all processes as illustrated in FIG. 12 are performed by a computer or a processor directed by a code. In another example, some or all processes as illustrated in FIG. 12 are performed according to instructions included by a computer-readable medium in a computer program product.

As discussed above, the spatial-temporal signature is determined based on the framerate used for determining the spatial-temporal signature for the current frame and the resolution used for dividing the current frame into a plurality of blocks according to an embodiment of the present invention. For example, spatial-temporal signatures for a current frame are determined based on multiple framerates and/or multiple resolutions for the current frame, and the STSB is determined by stacking the STS at multiple framerates and/or multiple resolutions according to an embodiment of the present invention.

For each frame, one or more of SSB, TSB, and STSB, with or without any other information, can form the Fingerprint Block (FB) for the corresponding frame according to an embodiment of the present invention. For example, a Fingerprint Block (FB) is a frame fingerprint, which includes one or more spatial signatures, one or more temporal signatures, and/or one or more spatial-temporal signatures. For a sequence of frames of a video object, the corresponding sequence of FBs can be used as the fingerprint for the video object according to another embodiment of the present invention. The fingerprint of the video object is stored in a database according to an embodiment of the present invention. For example, the database includes one or more fingerprints of one or more corresponding video objects.

As discussed above, FIG. 6 is a simplified system implementing the method 100 for characterizing and fingerprinting a digital video object according to an embodiment of the present invention. This diagram is merely an example, which should not unduly limit the scope of the claims. One of ordinary skill in the art would recognize many variations, alternatives, and modifications. The system 600 includes the decoder module 610, the fingerprinting module 620, the fingerprint database 630, and the application policy module 640.

As shown in FIG. 6, an input video is decoded by the decoder module 610 and fed to the fingerprinting module 620. The fingerprinting module 620 performs the method 100 according to an embodiment of the present invention. For example, the fingerprinting module 620 is implemented according to FIGS. 1, 2, 3, 4, 5, 7, 8, 9, 10, 11, and/or 12. The resulting video fingerprint is compared to the ones stored in the fingerprint database for identification, and the identification result is returned to the application along with associated metadata (e.g., title and ownership of the video content) and one or more policies. For example, policies include business rules indicating which identification should be blocked. Based on the identification result and the one or more policies, the application enforces certain the one or more policies at the application policy module 640. For example, if the video is identified to be a pirated version or copy, the application applies filtering.

As discussed above and further emphasized here, FIG. 6 is merely an example, which should not unduly limit the scope of the claims. One of ordinary skill in the art would recognize many variations, alternatives, and modifications. For example, anyone of the modules 610, 620, 630, and 640 can be either hardware or software, or a combination of hardware and software. In another example, the fingerprint database 630 can be embedded in an application or resided outside the application on a local hard drive or a remote server.

According to yet another embodiment of the present invention, a method for generating a spatial signature for a frame of a video object includes obtaining a frame associated with a video object, and dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the method includes determining a plurality of average pixel values for the plurality of blocks respectively. Each of the plurality of blocks corresponds to one of the plurality of average pixel values. Moreover, the method includes processing information associated with the plurality of average pixel values and determining a plurality of comparison values for the plurality of blocks respectively based on at least information associated with the plurality of average pixel values. Each of the plurality of blocks corresponds to at least a first comparison value of the plurality of comparison values, and each of the plurality of comparison values corresponds to one of the plurality of blocks and is equal to one selected from a group consisting of a first constant and a second constant. Also, the method includes processing information associated with the plurality of comparison values, and determining a sequence of comparison values based on at least information associated with the plurality of comparison values and the plurality of locations. The spatial signature for the frame includes information associated with the sequence of comparison values. The process for determining a plurality of comparison values includes, for each of the plurality of blocks, determining whether a first adjacent block exists for the each of the plurality of blocks based on at least information associated with one or more first predetermined criteria, and if the first adjacent block is determined to exist, determining the first comparison value based on at least information associated with a first average pixel value corresponding to the each of the plurality of blocks and a second average pixel value corresponding to the first adjacent block. For example, the method is implemented according to at least FIGS. 1, 7, and/or 8.

According to yet another embodiment of the present invention, a method for generating a temporal signature for a frame of a video object includes obtaining a plurality of frames at a first frame rate and associated with a video object. The plurality of frames includes at least a first frame, and the first frame includes a first plurality of pixels. Additionally, the method includes processing information associated with the plurality of frames, and determining a second frame based on at least information associated with the plurality of frames. The second frame includes a second plurality of pixels and is adjacent to the first frame based on at least information associated with a second frame rate. Moreover, the method includes processing information associated with a first plurality of pixel values corresponding to the first plurality of pixels respectively and a second plurality of pixel values corresponding to the second plurality of pixels respectively. Also, the method includes determining a sum of absolute differences between the first plurality of pixel values and the second plurality of pixel values respectively, processing information associated with the sum of absolute differences, determining a normalized difference by dividing the sum of absolute differences by the number of pixels for the first plurality of pixels, and performing a quantization process on the normalized difference to generate a integer difference. The integer difference is associated with a temporal signature for the first frame. For example, the method is implemented according to at least FIGS. 1 and/or 9.

According to yet another embodiment of the present invention, a method for generating a spatial-temporal signature for a frame of a video object includes obtaining a plurality of frames at a first frame rate and associated with a video object. The plurality of frames includes at least a first frame. Additionally, the method includes dividing the first frame into a first plurality of blocks. The first plurality of blocks corresponds to a first plurality of locations respectively, each of the first plurality of blocks includes a first plurality of pixels, and the first plurality of pixels corresponds to a first plurality of pixel values respectively. Moreover, the method includes determining a first plurality of average pixel values for the first plurality of blocks respectively. Each of the first plurality of blocks corresponds to one of the first plurality of average pixel values. Also, the method includes processing information associated with the plurality of frames, and determining a second frame based on at least information associated with the plurality of frames. The second frame is adjacent to the first frame based on at least information associated with a second frame rate. The second frame includes a second plurality of blocks corresponding to a second plurality of locations respectively and corresponding to a second plurality of average pixel values respectively. Additionally, the method includes processing information associated with the first plurality of average pixel values, the first plurality of locations, the second plurality of average pixel values, and the second plurality of locations. Each of the first plurality of average pixel values corresponds to one of the second plurality of average pixel values. Moreover, the method includes determining a plurality of comparison values for the first plurality of blocks respectively based on at least information associated with the first plurality of average pixel values and the second plurality of average pixel values. Each of the plurality of comparison values is equal to one selected from a group consisting of a first constant and a second constant. Also, the method includes processing information associated with the plurality of comparison values, and determining a sequence of comparison values based on at least information associated with the plurality of comparison values and the first plurality of locations. The spatial-temporal signature for the first frame corresponds to the second frame rate and including information associated with the sequence of comparison values. For example, the method is implemented according to FIGS. 1, 10, 11, and/or 12.

According to yet another embodiment of the present invention, a computer program product includes a computer readable medium including instructions for generating a spatial signature for a frame of a video object. The computer readable medium includes one or more instructions for obtaining a frame associated with a video object, and one or more instructions for dividing the frame into a plurality of blocks. The plurality of blocks corresponds to a plurality of locations respectively, each of the plurality of blocks includes a plurality of pixels, and the plurality of pixels corresponds to a plurality of pixel values respectively. Additionally, the computer readable medium includes one or more instructions for determining a plurality of average pixel values for the plurality of blocks respectively. Each of the plurality of blocks corresponds to one of the plurality of average pixel values. Moreover, the computer readable medium includes one or more instructions for processing information associated with the plurality of average pixel values, and one or more instructions for determining a plurality of comparison values for the plurality of blocks respectively based on at least information associated with the plurality of average pixel values. Each of the plurality of blocks corresponds to at least a first comparison value of the plurality of comparison values, and each of the plurality of comparison values corresponds to one of the plurality of blocks and is equal to one selected from a group consisting of a first constant and a second constant. Also, the computer readable medium includes one or more instructions for processing information associated with the plurality of comparison values, and one or more instructions for determining a sequence of comparison values based on at least information associated with the plurality of comparison values and the plurality of locations. The spatial signature for the frame includes information associated with the sequence of comparison values. The one or more instructions for determining a plurality of comparison values includes, one or more instructions, for each of the plurality of blocks, for determining whether a first adjacent block exists for the each of the plurality of blocks based on at least information associated with one or more first predetermined criteria, and if the first adjacent block is determined to exist, determining the first comparison value based on at least information associated with a first average pixel value corresponding to the each of the plurality of blocks and a second average pixel value corresponding to the first adjacent block. For example, the computer program product is implemented according to at least FIGS. 1, 6, 7, and/or 8.

According to yet another embodiment of the present invention, a computer program product includes a computer readable medium including instructions for generating a temporal signature for a frame of a video object. The computer readable medium includes one or more instructions for obtaining a plurality of frames at a first frame rate and associated with a video object. The plurality of frames includes at least a first frame, and the first frame includes a first plurality of pixels. Additionally, the computer readable medium includes one or more instructions for processing information associated with the plurality of frames, and one or more instructions for determining a second frame based on at least information associated with the plurality of frames. The second frame includes a second plurality of pixels and is adjacent to the first frame based on at least information associated with a second frame rate. Moreover, the computer readable medium includes one or more instructions for processing information associated with a first plurality of pixel values corresponding to the first plurality of pixels respectively and a second plurality of pixel values corresponding to the second plurality of pixels respectively. Also, the computer readable medium includes one or more instructions for determining a sum of absolute differences between the first plurality of pixel values and the second plurality of pixel values respectively, one or more instructions for processing information associated with the sum of absolute differences, one or more instructions for determining a normalized difference by dividing the sum of absolute differences by the number of pixels for the first plurality of pixels, and one or more instructions for performing a quantization process on the normalized difference to generate a integer difference. The integer difference is associated with a temporal signature for the first frame. For example, the computer program product is implemented according to at least FIGS. 1, 6, and/or 9.

According to yet another embodiment of the present invention, a computer program product includes a computer readable medium including instructions for generating a spatial-temporal signature for a frame of a video object. The computer readable medium includes one or more instructions for obtaining a plurality of frames at a first frame rate and associated with a video object. The plurality of frames includes at least a first frame. Additionally, the computer readable medium includes one or more instructions for dividing the first frame into a first plurality of blocks. The first plurality of blocks corresponds to a first plurality of locations respectively, each of the first plurality of blocks includes a first plurality of pixels, and the first plurality of pixels corresponds to a first plurality of pixel values respectively. Moreover, the computer readable medium includes one or more instructions for determining a first plurality of average pixel values for the first plurality of blocks respectively. Each of the first plurality of blocks corresponds to one of the first plurality of average pixel values. Also, the computer readable medium includes one or more instructions for processing information associated with the plurality of frames, and one or more instructions for determining a second frame based on at least information associated with the plurality of frames. The second frame is adjacent to the first frame based on at least information associated with a second frame rate, and the second frame includes a second plurality of blocks corresponding to a second plurality of locations respectively and corresponding to a second plurality of average pixel values respectively. Additionally, the computer readable medium includes one or more instructions for processing information associated with the first plurality of average pixel values, the first plurality of locations, the second plurality of average pixel values, and the second plurality of locations. Each of the first plurality of average pixel values corresponds to one of the second plurality of average pixel values. Moreover, the computer readable medium includes one or more instructions for determining a plurality of comparison values for the first plurality of blocks respectively based on at least information associated with the first plurality of average pixel and the second plurality of average pixel values. Each of the plurality of comparison values is equal to one selected from a group consisting of a first constant and a second constant. Also, the computer readable medium includes one or more instructions for processing information associated with the plurality of comparison values, and one or more instructions for determining a sequence of comparison values based on at least information associated with the plurality of comparison values and the first plurality of locations. The spatial-temporal signature for the first frame corresponds to the second frame rate and includes information associated with the sequence of comparison values. For example, the computer program product is implemented according to at least FIGS. 1, 6, 10, 11, and/or Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer implemented method for generating a spatial signature for a frame of a video object in a computer system programmed to perform the method, the method comprising:
    obtaining in the computer system, a frame associated with a video object;
    dividing in the computer system, the frame into a plurality of blocks, the plurality of blocks corresponding to a plurality of locations respectively, each of the plurality of blocks including a plurality of pixels, the plurality of pixels corresponding to a plurality of pixel values respectively;
    determining in the computer system, a plurality of average pixel values for the plurality of blocks respectively, each of the plurality of blocks corresponding to one of the plurality of average pixel values;
    processing in the computer system, information associated with the plurality of average pixel values;
    determining in the computer system, a plurality of comparison values for the plurality of blocks respectively based on at least information associated with the plurality of average pixel values, each of the plurality of blocks corresponding to at least a first comparison value of the plurality of comparison values, each of the plurality of comparison values corresponding to one of the plurality of blocks and being equal to one selected from a group consisting of a first constant and a second constant;
    processing in the computer system, information associated with the plurality of comparison values;
    determining in the computer system, a sequence of comparison values based on at least information associated with the plurality of comparison values and the plurality of locations, the spatial signature for the frame including information associated with the sequence of comparison values;
    wherein the process for determining in the computer system, a plurality of comparison values includes, for each of the plurality of blocks,
        determining in the computer system, whether a first adjacent block exists for the each of the plurality of blocks based on at least information associated with one or more first predetermined criteria;
        if the first adjacent block is determined to exist, determining in the computer system, the first comparison value based on at least information associated with a first average pixel value corresponding to the each of the plurality of blocks and a second average pixel value corresponding to the first adjacent block.

2. The method of claim 1 wherein the process for determining in the computer system, a sequence of comparison values comprises:
    scanning in the computer system, the plurality of blocks based on a predetermined pattern;
    determining in the computer system, a sequence of blocks as a result of the scanning process;
    arranging in the computer system, the each of the plurality of comparison values based on at least information associated with a location of the corresponding block in the sequence of blocks.

3. The method of claim 2 wherein the predetermined pattern is associated with a raster scan.

4. The method of claim 2 wherein the predetermined pattern is associated with an onion scan.

5. The method of claim 1 wherein the process for determining in the computer system, a plurality of comparison values further includes, for the each of the plurality of blocks, if the first adjacent block is determined not to exist,
    selecting in the computer system, another block from the plurality of blocks, the another block being different from the each of the plurality of blocks;
    determining in the computer system, the first comparison value based on at least information associated with the first average pixel value corresponding to the each of the plurality of blocks and a third average pixel value corresponding to the another block.

6. The method of claim 1 wherein the process for determining in the computer system, a plurality of comparison values further includes, for the each of the plurality of blocks, if the first adjacent block is determined not to exist, assigning in the computer system, a predetermined constant to the first comparison value.

7. The method of claim 6 wherein the predetermined constant is equal to the first constant or the second constant.

8. The method of claim 1 wherein:
the plurality of blocks is arranged in a first direction and a second direction;
each of the plurality of blocks corresponds to at least the first comparison value of the plurality of comparison values and a second comparison value of the plurality of comparison values.

9. The method of claim 8 wherein:
the first adjacent block is adjacent to the each of the plurality of blocks in the first direction;
the process for determining in the computer system, a plurality of comparison values further includes, for each of the plurality of blocks,
determining in the computer system, whether a second adjacent block exists for the each of the plurality of blocks based on at least information associated with one or more second predetermined criteria, the second adjacent block being adjacent to the each of the plurality of blocks in the second direction;
if the second adjacent block is determined to exist, determining in the computer system, the second comparison value based on at least information associated with the first average pixel value corresponding to the each of the plurality of blocks and a third average pixel value corresponding to the second adjacent block.

10. The method of claim 8 wherein the first direction and the second direction are substantially perpendicular to each other.

11. The method of claim 8 wherein:
the process for dividing in the computer system, the frame into a plurality of blocks includes dividing in the computer system, the frame into a number of columns and a number of rows, the number of columns being associated with the first direction, the number of rows being associated with the second direction;
the spatial signature for the frame corresponds to a resolution represented by, at least, the number of columns and the number of rows.

12. The method of claim 11 wherein the resolution is a base resolution, and the spatial signature is a based spatial signature.

13. A computer implemented method for generating a temporal signature for a frame of a video object in a computer system programmed to perform the method, the method comprising:
obtaining in the computer system, a plurality of frames at a first frame rate and associated with a video object, the plurality of frames including at least a first frame, the first frame including a first plurality of pixels;
processing in the computer system, information associated with the plurality of frames;
determining in the computer system, a second frame based on at least information associated with the plurality of frames, the second frame including a second plurality of pixels and being adjacent to the first frame based on at least information associated with a second frame rate;
processing in the computer system, information associated with a first plurality of pixel values corresponding to the first plurality of pixels respectively and a second plurality of pixel values corresponding to the second plurality of pixels respectively;
determining in the computer system, a sum of absolute differences between the first plurality of pixel values and the second plurality of pixel values respectively;
processing in the computer system, information associated with the sum of absolute differences;
determining in the computer system, a normalized difference by dividing the sum of absolute differences by the number of pixels for the first plurality of pixels;
performing in the computer system, a quantization process on the normalized difference to generate a integer difference, the integer difference being associated with a temporal signature for the first frame.

14. The method of claim 13 wherein the process for determining in the computer system, a second frame includes selecting in the computer system, the second frame from the plurality of frames based on at least information associated with the second frame rate, the second frame rate corresponding to a time period, the second frame being previous in time with respect to the first frame.

15. The method of claim 14 wherein a time interval between the second frame and the first frame is closest to the time period in magnitude among all of the plurality of frames that are previous in time with respect to the first frame.

16. The method of claim 13 wherein:
the first frame rate and the second frame rate are different;
the first frame rate corresponds to the video object;
the second frame rate corresponds to the temporal signature for the first frame.

17. The method of claim 16 wherein if the first frame rate is higher than the second frame rate, the second frame is a down-sampled adjacent frame for the first frame.

18. The method of claim 13 wherein the process for determining in the computer system, a sum of absolute differences comprises:
determining in the computer system, magnitudes of differences between the first plurality of pixel values and the second plurality of pixel values respectively;
summing in the computer system, the magnitudes of differences to determine the sum of absolute differences.

19. A computer implemented method for generating a spatial-temporal signature for a frame of a video object in a computer system programmed to perform the method, the method comprising:
obtaining in the computer system, a plurality of frames at a first frame rate and associated with a video object, the plurality of frames including at least a first frame;
dividing in the computer system, the first frame into a first plurality of blocks, the first plurality of blocks corresponding to a first plurality of locations respectively, each of the first plurality of blocks including a first plurality of pixels, the first plurality of pixels corresponding to a first plurality of pixel values respectively;
determining in the computer system, a first plurality of average pixel values for the first plurality of blocks respectively, each of the first plurality of blocks corresponding to one of the first plurality of average pixel values;
processing in the computer system, information associated with the plurality of frames;
determining in the computer system, a second frame based on at least information associated with the plurality of frames, the second frame being adjacent to the first frame based on at least information associated with a second frame rate, the second frame including a second plurality of blocks corresponding to a second plurality of locations respectively and corresponding to a second plurality of average pixel values respectively;
processing in the computer system, information associated with the first plurality of average pixel values, the first plurality of locations, the second plurality of average pixel values, and the second plurality of locations, each of the first plurality of average pixel values corresponding to one of the second plurality of average pixel values;

determining in the computer system, a plurality of comparison values for the first plurality of blocks respectively based on at least information associated with the first plurality of average pixel values and the second plurality of average pixel values, each of the plurality of comparison values being equal to one selected from a group consisting of a first constant and a second constant;

processing in the computer system, information associated with the plurality of comparison values;

determining in the computer system, a sequence of comparison values based on at least information associated with the plurality of comparison values and the first plurality of locations, the spatial-temporal signature for the first frame corresponding to the second frame rate and including information associated with the sequence of comparison values.

20. The method of claim 19 wherein the process for determining in the computer system, a sequence of comparison values comprises:

scanning in the computer system, the first plurality of blocks based on a predetermined pattern;

determining in the computer system, a sequence of blocks as a result of the scanning process;

arranging in the computer system, the each of the plurality of comparison values based on at least information associated with a location of a corresponding block in the sequence of blocks.

21. The method of claim 20 wherein the predetermined pattern is associated with a raster scan.

22. The method of claim 20 wherein the predetermined pattern is associated with an onion scan.

23. The method of claim 19 wherein:

the process for dividing in the computer system, the first frame into a first plurality of blocks includes dividing the first frame into a number of columns and a number of rows;

the spatial-temporal signature for the first frame corresponds to the second frame rate and a resolution represented by, at least, the number of columns and the number of rows.

24. The method of claim 19 wherein the process for determining in the computer system, a second frame includes selecting in the computer system, the second frame from the first plurality of frames based on at least information associated with the second frame rate, the second frame rate corresponding to a time period, the second frame being previous in time with respect to the first frame.

25. The method of claim 24 wherein a time interval between the second frame and the first frame is closest to the time period in magnitude among all of the plurality of frames that are previous in time with respect to the first frame.

26. The method of claim 19 wherein:

the first frame rate and the second frame rate are different;
the first frame rate corresponds to the video object.

27. The method of claim 26 wherein if the first frame rate is higher than the second frame rate, the second frame is a down-sampled adjacent frame for the first frame.

28. A computer program product including a non-transitory computer readable medium including instructions for generating in a computer system, a spatial signature for a frame of a video object, the computer readable medium comprising:

one or more instructions for obtaining a frame associated with a video object;

one or more instructions for dividing the frame into a plurality of blocks, the plurality of blocks corresponding to a plurality of locations respectively, each of the plurality of blocks including a plurality of pixels, the plurality of pixels corresponding to a plurality of pixel values respectively;

one or more instructions for determining a plurality of average pixel values for the plurality of blocks respectively, each of the plurality of blocks corresponding to one of the plurality of average pixel values;

one or more instructions for processing information associated with the plurality of average pixel values;

one or more instructions for determining a plurality of comparison values for the plurality of blocks respectively based on at least information associated with the plurality of average pixel values, each of the plurality of blocks corresponding to at least a first comparison value of the plurality of comparison values, each of the plurality of comparison values corresponding to one of the plurality of blocks and being equal to one selected from a group consisting of a first constant and a second constant;

one or more instructions for processing information associated with the plurality of comparison values;

one or more instructions for determining a sequence of comparison values based on at least information associated with the plurality of comparison values and the plurality of locations, the spatial signature for the frame including information associated with the sequence of comparison values;

wherein the one or more instructions for determining a plurality of comparison values includes, one or more instructions, for each of the plurality of blocks, for determining whether a first adjacent block exists for the each of the plurality of blocks based on at least information associated with one or more first predetermined criteria;

if the first adjacent block is determined to exist, determining the first value based on at least information associated with a first average pixel value corresponding to the each of the plurality of blocks and a second average pixel value corresponding to the first adjacent block.

29. A computer program product including a non-transitory computer readable medium including instructions for generating in a computer system, a temporal signature for a frame of a video object, the computer readable medium comprising:

one or more instructions for obtaining a plurality of frames at a first frame rate and associated with a video object, the plurality of frames including at least a first frame, the first frame including a first plurality of pixels;

one or more instructions for processing information associated with the plurality of frames;

one or more instructions for determining a second frame based on at least information associated with the plurality of frames, the second frame including a second plurality of pixels and being adjacent to the first frame based on at least information associated with a second frame rate;

one or more instructions for processing information associated with a first plurality of pixel values corresponding to the first plurality of pixels respectively and a second plurality of pixel values corresponding to the second plurality of pixels respectively;

one or more instructions for determining a sum of absolute differences between the first plurality of pixel values and the second plurality of pixel values respectively;
one or more instructions for processing information associated with the sum of absolute differences;
one or more instructions for determining a normalized difference by dividing the sum of absolute differences by the number of pixels for the first plurality of pixels;
one or more instructions for performing a quantization process on the normalized difference to generate a integer difference, the integer difference being associated with a temporal signature for the first frame.

30. A computer program product including a non-transitory computer readable medium including instructions for generating a spatial-temporal signature for a frame of a video object, the computer readable medium comprising:
one or more instructions for obtaining a plurality of frames at a first frame rate and associated with a video object, the plurality of frames including at least a first frame;
one or more instructions for dividing the first frame into a first plurality of blocks, the first plurality of blocks corresponding to a first plurality of locations respectively, each of the first plurality of blocks including a first plurality of pixels, the first plurality of pixels corresponding to a first plurality of pixel values respectively;
one or more instructions for determining a first plurality of average pixel values for the first plurality of blocks respectively, each of the first plurality of blocks corresponding to one of the first plurality of average pixel values;
one or more instructions for processing information associated with the plurality of frames;
one or more instructions for determining a second frame based on at least information associated with the plurality of frames, the second frame being adjacent to the first frame based on at least information associated with a second frame rate, the second frame including a second plurality of blocks corresponding to a second plurality of locations respectively and corresponding to a second plurality of average pixel values respectively;
one or more instructions for processing information associated with the first plurality of average pixel values, the first plurality of locations, the second plurality of average pixel values, and the second plurality of locations, each of the first plurality of average pixel values corresponding to one of the second plurality of average pixel values;
one or more instructions for determining a plurality of comparison values for the first plurality of blocks respectively based on at least information associated with the first plurality of average pixel values and the second plurality of average pixel values, each of the plurality of comparison values being equal to one selected from a group consisting of a first constant and a second constant;
one or more instructions for processing information associated with the plurality of comparison values;
one or more instructions for determining a sequence of comparison values based on at least information associated with the plurality of comparison values and the first plurality of locations, the spatial-temporal signature for the first frame corresponding to the second frame rate and including information associated with the sequence of comparison values.

* * * * *